US012784213B2

(12) United States Patent
Nguyen et al.

(10) Patent No.: US 12,784,213 B2
(45) Date of Patent: Nov. 3, 2026

(54) COMPUTE SYSTEM WITH SKIN PATHOLOGY MECHANISM AND METHOD OF OPERATION THEREOF

(71) Applicant: BelleTorus Corporation, Cambridge, MA (US)

(72) Inventors: Thi Thu Hang Nguyen, Toulouse (FR); Léa Mathilde Gazeau, Toulouse (FR); Paul Fricker, Toulouse (FR)

(73) Assignee: BelleTorus Corporation, Cambridge, MA (US)

( * ) Notice: Subject to any disclaimer, the term of this patent is extended or adjusted under 35 U.S.C. 154(b) by 0 days.

(21) Appl. No.: 19/085,385

(22) Filed: Mar. 20, 2025

(65) Prior Publication Data

US 2026/0228884 A1 Aug. 6, 2026

Related U.S. Application Data

(60) Provisional application No. 63/751,997, filed on Jan. 31, 2025.

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/20116* (2013.01); *G06T 2207/30088* (2013.01)

(58) Field of Classification Search
CPC ............................................ G06T 2207/30088
See application file for complete search history.

(56) References Cited

U.S. PATENT DOCUMENTS 10,140,421 B1 * 11/2018 Bernard ............... G06V 10/764
10,593,040 B2 * 3/2020 Zouridakis ............ G06T 7/0012
11,890,105 B1 * 2/2024 Nguyen ................. A61B 5/441
11,935,644 B2 * 3/2024 Jackson ................. G16H 30/40
12,100,152 B1 * 9/2024 Nguyen .................... G06T 3/40
12,190,516 B1 * 1/2025 Nguyen .................... G06T 7/12
(Continued)

FOREIGN PATENT DOCUMENTS

CN 119173904 A * 12/2024 ............. G06N 3/045
JP 2023040229 A * 3/2023 ............. A61B 5/441

OTHER PUBLICATIONS

Daniel Sonntag and Fabrizio Nunnari and Hans-Jürgen Profitlich, The Skincare project, an interactive deep learning system for differential diagnosis of malignant skin lesions. Technical Report, 2020,, p. 1-20 (Year: 2020).*
(Continued)

*Primary Examiner* — Gandhi Thirugnanam
(74) *Attorney, Agent, or Firm* — Perspectives Law Group, Corp.

(57) ABSTRACT

A method of operation of a compute system includes: generating a skin segmented output including a skin region based on a patient image; generating a disease severity heatmap based on the skin segmented output and the patient image; generating a disease severity contour based on the disease severity heatmap and for the skin region; generating a disease score from the disease severity heatmap; and communicating the disease severity contour, the disease score, or a combination thereof for displaying on a device.

20 Claims, 11 Drawing Sheets
(9 of 11 Drawing Sheet(s) Filed in Color)

(56) References Cited

U.S. PATENT DOCUMENTS

| | | | | |
|---|---|---|---|---|
| 12,217,422 | B1 * | 2/2025 | Nguyen | G06T 7/11 |
| 2017/0231550 | A1 * | 8/2017 | Do | G06T 7/0012 382/128 |
| 2018/0061046 | A1 * | 3/2018 | Bozorgtabar | G06T 7/11 |
| 2019/0298252 | A1 * | 10/2019 | Patwardhan | A61B 5/0082 |
| 2020/0342594 | A1 * | 10/2020 | Dissanayake | G16H 20/70 |
| 2021/0012493 | A1 * | 1/2021 | Jiang | G16H 30/40 |
| 2022/0087548 | A1 * | 3/2022 | Wong | A61B 5/0261 |
| 2022/0301290 | A1 * | 9/2022 | Huang | G06V 40/168 |
| 2023/0214970 | A1 * | 7/2023 | Koide | A61B 5/0077 382/128 |
| 2023/0343078 | A1 * | 10/2023 | Dey | G06T 7/11 |
| 2024/0130669 | A1 * | 4/2024 | Nguyen | G06N 3/0455 |
| 2024/0135533 | A1 * | 4/2024 | Nguyen | G06T 7/11 |
| 2024/0257341 | A1 * | 8/2024 | Nguyen | G06T 7/0012 |
| 2025/0322511 | A1 * | 10/2025 | Defresne | G06T 7/0012 |

OTHER PUBLICATIONS

Moon, CI., Lee, J., Baek, Y.S et al. Psoriasis severity classification based on adaptive multi-scale features for multi-severity disease. Sci Rep 13, 17331 (2023). (Year: 2023).*

Elena Bernardis, Leslie Castelo-Soccio, Quantifying Alopecia Areata via Texture Analysis to Automate the SALT Score Computation, Journal of Investigative Dermatology Symposium Proceedings, vol. 19, Issue 1, 2018, p. s34-s40 (Year: 2010).*

Zarqa Ali, Andrei Chiriac, Theis Bjerre-Christensen, Ari Pall Isberg, Priyanka Dahiya, Ionela Manole, et al., Mild to moderate atopic dermatitis severity can be reliably assessed using smartphone-photographs taken by the patient at home: A validation study, 2022;28: pp. 336-341, https://doi.org/10.1111/srt. 13136, © 2022 The Authors. Skin Research and Technology published by John Wiley & Sons Ltd.

Zarqa Ali, Kristina Melbardis Joergensen, et al., N, Remote Rating of Atopic Dermatitis Severity Using Photo-Based Assessments: Proof-of-Concept and Reliability Evaluation, pp. 1-8, JMIR Formative Research 2021; vol. 5 (Issue 5): e24766, URL: https://formative.jmir.org/2021/5/e24766. doi: 10.2196/24766, PMID.

Zarqa Ali, John Robert Zibert, et al., Mild-to-moderate severity of psoriasis may be assessed remotely based on photographs and self-reported extent of skin involvement; Digital Health in Dermatology, © 2023 by the American Academy of Dermatology, Inc. Published by Elsevier Inc. (http://creativecommons.org/licenses/by/4.0/). https://doi.org/10.1016/j.jdin.2023.02.004. pp. 129 to 135, JAAD Int, vol. 11.

Abdulaziz G. Aljohani, Mohammed H. Abduljabbar, Jehad Hariri, et al. (Apr. 19, 2023) Assessing the Ability of Non-dermatology Physicians to Recognize Urgent Skin Diseases. Cureus 15(4): e37823. DOI 10.7759/cureus.37823, © Copyright 2023, pp. 1 to 7.

Rahman Attar, Guillem Hurault, Zihao Wang, Ricardo Mokhtari, Kevin Pan, Bayanne Olabi, Eleanor Earp, Lloyd Steele, Hywel C. Williams, and Reiko J. Tanaka, Reliable Detection of Eczema Areas for Fully Automated Assessment of Eczema Severity from Digital Camera Images, © 2023 The Authors. Published by Elsevier Inc. on behalf of the Society for Investigative Dermatology. (http://creativecommons.org/licenses/by-nc-nd/4.0/), www.jidinnovations.org, JID Innovations 2023;3:100213, pp. 1 to 8.

Chul Hwan Bang, Jae Woong Yoon, Jae Yeon Ryu, Jae Heon Chun, Ju Hee Han, Young Bok Lee, Jun Young Lee, Young Min Park, Suk Jun Lee, and Ji Hyun Lee, Automated severity scoring of atopic dermatitis patients by a deep neural network, Scientific Reports, (2021) 11:6049, https://doi.org/10.1038/s41598-021-85489-8, natureportfolio.

Cho-I. Moon, Jiwon Lee, Yoo Sang Baek, and Onesok Lee, Psoriasis severity classification based on adaptive multi-scale features for multi-severity disease, 16 pages, Scientific Reports, (2023) 13:17331 | https://doi.org/10.1038/s41598-023-44478-9, www.nature.com/scientificreports/ © The Author(s) 2023.

Hang Nguyen, Léa Gazeau, and Jonathan Wolfe, Using artificial intelligence to compute Severity of Alopecia Tool scores, Research Letter, Published by Elsevier Inc. on behalf of the American Academy of Dermatology, Inc. This is an open access article under the CC BYNC-ND license (http://creativecommons.org/licenses/by-nc-nd/4.0/)., Feb. 2025, pp. 101 to 102, https://doi.org/10.1016/j.jdin.2024.04.003.

Kevin Pan, Guillem Hurault, Kai Arulkumaran, Hywel C. Williams, and Reiko J. Tanaka (2020), EczemaNet: Automating Detection and Severity Assessment of Atopic Dermatitis, pp. 220 to 230, International Workshop on Machine Learning in Medical Imaging, MLMI 2020. Lecture Notes in Computer Science(), vol. 12436, Publisher Springer, Cham. https://doi.org/10.1007/978-3-030-59861-7_23.

Rahul Ranjan, Richard Partl, Ricarda Erhart, Nithin Kurup, and Harald Schnidar, The mathematics of erythema: Development of machine learning models for artificial intelligence assisted measurement and severity scoring of radiation induced dermatitis. Computers in Biology and Medici139 (2021) 104952 journal, pp. 1 to 13 homepage: www.elsevier.com/locate/compbiomed, Published by Elsevier Ltd., https:/ /doi.org/10.1016/j.compbiomed.2021.104952, Accepted Oct. 14, 2021, Available online Oct. 27, 2021, 0010-4825/© 2021 The.

M.A. Richard, C. Paul, T. Nijsten, P. Gisondi, C. Salavastru, C. Taieb, M. Trakatelli, L. Puig, A. Stratigos, Eadv Burden of Skin Diseases Project Team, Prevalence of most common skin diseases in Europe: a population-based study, pp. 1088 to 1096, DOI: 10.1111/jdv.18050, JEADV 2022, 36, 1088-1096 © 2022 The Authors. Journal of the European Academy of Dermatology and Venereology published by John Wiley & Sons Ltd on behalf of European Academy of Dermatology and Venereology.

Olaf Ronneberger, Philipp Fischer, and Thomas Brox, U-Net: Convolutional Networks for Biomedical Image Segmentation, pp. 1 to 8, MICCAI 2015, arXiv:1505.04597v1 [cs.CV] May 18, 2015.

M.J. Schaap, N.J. Cardozo, A. Patel, E.M.G.J. De Jong, B. Van Ginneken, M.M.B. Seyger, Image-based automated Psoriasis Area Severity Index scoring by Convolutional Neural Networks, DOI: 10.1111/jdv.17711, JEADV 2022, 36, pp. 68-75 © 2021 The Authors. Journal of the European Academy of Dermatology and Venereology published by John Wiley & Sons Ltd, on behalf of European Academy of Dermatology and Venereology, PASI scoring by Convolutional Neural Networks.

* cited by examiner

COMPUTE SYSTEM WITH SKIN PATHOLOGY MECHANISM AND METHOD OF OPERATION THEREOF

CROSS REFERENCE TO RELATED APPLICATION

This application claims the benefit of U.S. Provisional Patent Application Ser. No. 63/751,997 filed Jan. 31, 2025, and the subject matter thereof is incorporated herein by reference thereto.

TECHNICAL FIELD

An embodiment of the present invention relates generally to a compute system, and more particularly to a system with an AI based skin pathology mechanism.

BACKGROUND

The integration of artificial intelligence (AI) in dermatological diagnostics has the potential to revolutionize patient care, particularly in the assessment and scoring of skin conditions. Traditional AI systems often function as black-box models on scoring tasks, outputting a single regressed score when presented with an image.

Thus, a need still remains for a compute system with an AI based skin pathology mechanism to provide AI based approach to provide ability for clinicians to do visual inspection and region-specific assessments to diagnose and grade skin conditions. In view of the ever-increasing commercial competitive pressures, along with growing healthcare needs, healthcare expectations, and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a compute system including: generating a skin segmented output including a skin region based on a patient image; generating a disease severity heatmap based on the skin segmented output and the patient image; generating a disease severity contour based on the disease severity heatmap and for the skin region; generating a disease score from the disease severity heatmap; and communicating the disease severity contour, the disease score, or a combination thereof for displaying on a device.

An embodiment of the present invention provides a compute system, including a control circuit, including a processor, configured to: generate a skin segmented output including a skin region based on a patient image; generate a disease severity heatmap based on the skin segmented output and the patient image; generate a disease severity contour based on the disease severity heatmap and for the skin region; generate a disease score from the disease severity heatmap; and communicate the disease severity contour, the disease score, or a combination thereof for displaying on a device.

An embodiment of the present invention provides a non-transitory computer readable medium including instructions executable by a control circuit for a compute system including: generating a skin segmented output including a skin region based on a patient image; generating a disease severity heatmap based on the skin segmented output and the patient image; generating a disease severity contour based on the disease severity heatmap and for the skin region; generating a disease score from the disease severity heatmap; and communicating the disease severity contour, the disease score, or a combination thereof for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

BEST MODE FOR CARRYING OUT THE INVENTION

Figure 1:
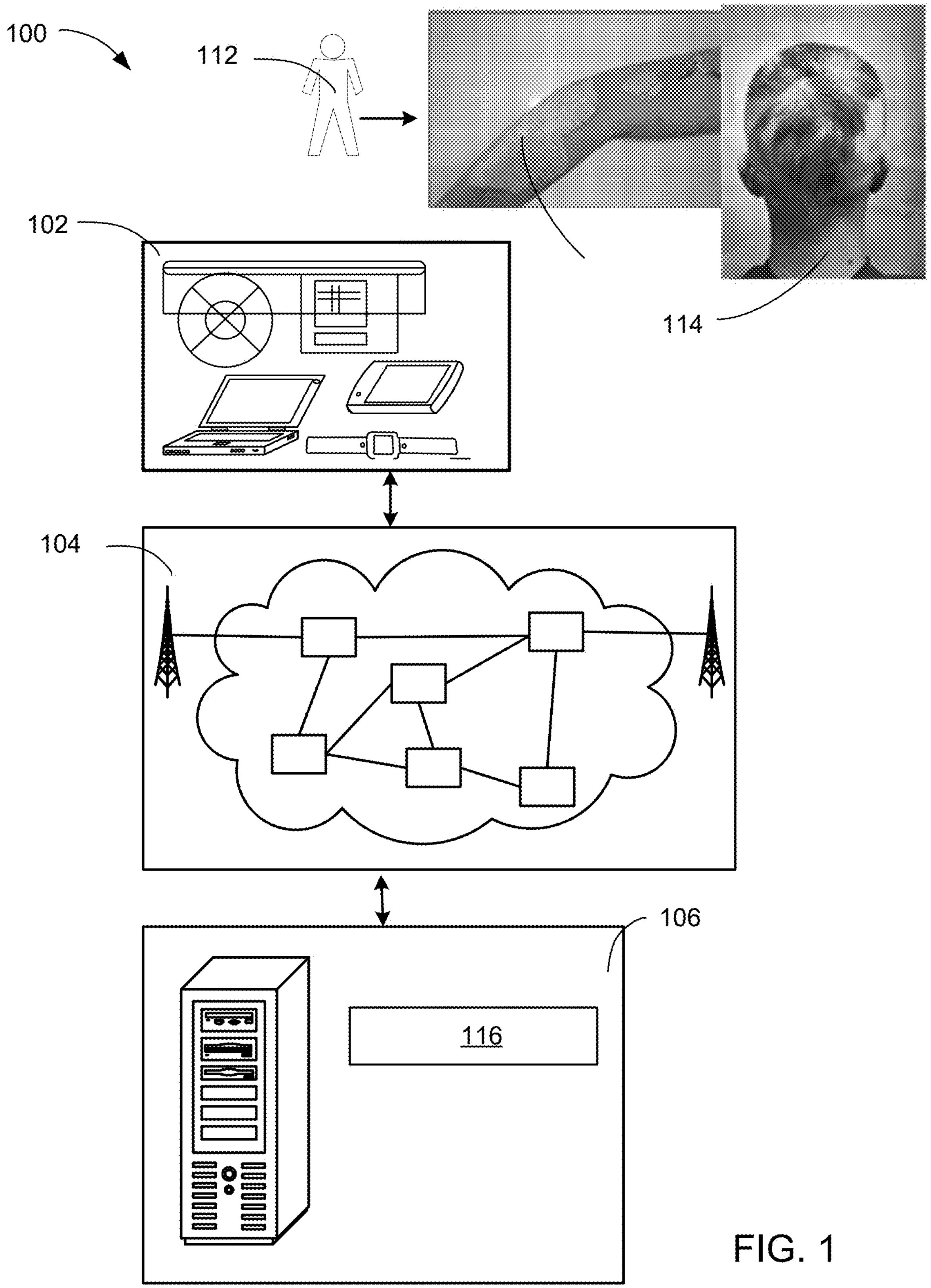
FIG. 1 is an example of a system architectural diagram of a compute system with a skin pathology mechanism in an embodiment of the present invention.

The severity of skin diseases can be assessed using photographs, enabling the development of AI applications to assist in severity scoring. Despite their potential, some AI systems are trained on subjective severity scores provided by different doctors, leading to inconsistencies. Furthermore, these systems often function as black boxes, providing little insight into their predictions, thus making it difficult for healthcare professionals to understand the reasoning behind AI predictions fully.

One or more embodiments provide a heatmap-based approach to improve AI accuracy and interpretability in assessing skin disease severity. By generating heatmaps that highlight severe regions with high-intensity pixels and mild areas with low-intensity pixels, an embodiment provides clear visual delineation of severity levels. These heatmaps can be converted into contour maps for better clinical usability and customization based on physician preferences. Unlike existing AI models that offer a single severity score for the entire image, overlooking intra-lesion variability, segmenting lesions into smaller patches, an embodiment enhances flexibility and interpretability, addressing key limitations in current approaches.

One or more embodiments of the invention provide a heatmap-based approach to improve AI accuracy and interpretability in assessing skin disease severity. By generating heatmaps that highlight severe regions with high-intensity pixels and mild areas with low-intensity pixels, an embodiment provides clear visual delineation of severity levels. These heatmaps can be converted into contour maps for better clinical usability and customization based on physician preferences. Unlike existing AI models that offer a single severity score for the entire image, overlooking intra-lesion variability, segmenting lesions into smaller patches, one or more embodiments of the invention enhances flexibility and interpretability, addressing key limitations in other approaches.

One or more embodiments provide AI based approach to provide ability for clinicians to do visual inspection and region-specific assessments to diagnose and grade skin conditions, review the appropriate severity score of the skin pathology, or a combination thereof. One or more embodiments provide an AI-based heatmap approach for scoring skin lesions that mirrors the diagnostic practices of dermatologists. By generating explainable heatmaps, the one or more embodiments highlights the most affected skin regions according to predefined criteria or scoring systems specific to conditions. These heatmaps allow for a localized severity assessment and facilitate a transparent global evaluation of the patient's skin condition. One or more embodiments provide the self-explanatory visualization enhances the interpretability of AI models, fostering trust and usability among clinicians. One or more embodiments represents a mechanism of integrating AI seamlessly into dermatological workflows, ultimately improving diagnostic accuracy, patient outcomes, and transparency of such systems in critical environments.

An embodiment generates visualizing AI scoring results for skin lesion images through interpretable heatmaps that align with clinical diagnostic workflows. At least one embodiment includes heatmap of severity generation, converting to severity score, or a combination thereof. As an example, an embodiment can generate the heatmap of severity generation before converting the heatmap of the severity to a severity score. As a further example, the operation can occur in a swapped order as described. As yet a further example, the operation can occur concurrently.

In this example, an embodiment is described for transparency and usability for clinical applications. Unlike traditional AI models that output an opaque, single numerical score, this example enhances interpretability by offering practitioners a clear visual rationale for the derived scores. Moreover, when an embodiments generates the severity into contours, heatmaps provide a layer of transparency, enabling clinicians to visually verify the severity distribution and understand the rationale behind the AI's assessment. This facilitates greater trust in the embodiment and allows for better integration into clinical workflows.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components as a matter of descriptive convenience and are not intended to have any other significance or provide limitations for an embodiment of the present invention.

The embodiments have been numbered first embodiment, second embodiment, etc. or can be described without a numeric designation as a matter of descriptive convenience and are not intended to have any other significance or provide limitations for an embodiment of the present invention. The terms first, second, etc. or without a numeric designation can be used throughout as part of element names and are used as a matter of descriptive convenience and are not intended to have any other significance or provide limitations for an embodiment.

The term "module" or "unit" or "circuit" or "mechanism" referred to herein can include or be implemented as or include software running on specialized hardware, hardware, or a combination thereof in the present invention in accordance with the context in which the term is used. For example, the software can be machine code, firmware, embedded code, and application software. The software can also include a function, a call to a function, a code block, or a combination thereof.

Also, for example, the hardware can be gates, circuitry, processor, computer, integrated circuit, integrated circuit cores, memory devices, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "unit" or a "circuit" is written in the claims section below, the "unit" or the "circuit" is deemed to include hardware circuitry for the purposes and the scope of the claims.

The module, units, circuits, or mechanism in the following description of the embodiments can be coupled or attached to one another as described or as shown, as examples. The coupling or attachment can be direct or indirect without or with intervening items between coupled or attached modules or units or circuits or mechanisms. The coupling or attachment can be by physical contact or by communication between modules or units or circuits or mechanisms, such as wireless communication.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Referring now to FIG. 1, therein is shown an example of a system architecture diagram of a compute system 100 with a skin pathology mechanism in an embodiment of the present invention. One or more embodiments of the compute system 100 provide heatmap-based approach to improve AI accuracy and interpretability in assessing skin disease severity. By generating heatmaps that highlight severe regions with high-intensity pixels and mild areas with low-intensity pixels, an embodiment provides clear visual delineation of severity levels. These heatmaps can be converted into contour maps for better clinical usability and customization based on physician preferences.

The compute system 100 can include a first device 102, such as a client or a server, connected to a second device 106, such as a client or server. The first device 102 can communicate with the second device 106 through a network 104, such as a wireless or wired network.

For example, the first device 102 can be of any of a variety of computing devices, such as a smart phone, a tablet, a cellular phone, personal digital assistant, a notebook computer, a wearable device, internet of things (IoT) device, or other multi-functional device. Also, for example, the first device 102 can be included in a device or a sub-system.

The first device 102 can couple, either directly or indirectly, to the network 104 to communicate with the second device 106 or can be a stand-alone device. The first device 102 can further be separate form or incorporated with a smart phone, a tablet computer, a laptop computer, a scanner, or other personal electronic devices.

For illustrative purposes, the compute system 100 is described with the first device 102 as a mobile device, although it is understood that the first device 102 can be different types of devices. For example, the first device 102 can also be a non-mobile computing device, such as a server, a server farm, cloud computing, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the compute system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device.

Also, for illustrative purposes, the compute system 100 is described with the second device 106 as a computing device, although it is understood that the second device 106 can be different types of devices. Also, for illustrative purposes, the compute system 100 is shown with the second device 106 and the first device 102 as endpoints of the network 104, although it is understood that the compute system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

For example, the compute system 100 can provide the functions for the patients 112 or other users working with the patients 112 with the first device 102, the second device 106, distributed between these two devices, or a combination thereof. Also as examples, the compute system 100 can provide a mobile applications for the patients, the clinicians, or a combination thereof. Further as an example, the compute system 100 can provide the functions via a web-browser based applications or a software to be executed on the first device 102, the second device 106, distributed between these two devices, or a combination thereof.

In one embodiment as an example, patient images 114 are taken and uploaded by the patient or for the patient and reviewed by the clinician. In this embodiment, a patient launches the skin pathology mechanism via the mobile application and logs into the patient's account. The patient or the user of the mobile application can be prompted to upload or take images as the patient images 114. The compute system 100 can guide a patient 112 or a user of the mobile application on photo guidelines for the patient images 114 and accepts or rejects the patient images 114 for retake based on a pre-specified criteria, e.g., distance, quality, blur, or a combination thereof. The compute system 100 can also provide guides for a patient or another user on capturing videos as opposed to still photos. Also for example, the patient images 114 can be selected from the video.

Once the patient images 114 are successfully uploaded, the compute system 100 can send or load the patient images 114 to a skin pathology mechanism 116 for analysis. The skin pathology mechanism 116 will be described later. For brevity and clarity and as an example, the skin pathology mechanism 116 is shown as being executed in the second device 106 although it is understood that portions can operate on the first device 102, such as the mobile application or the web-browser based application, can operate completely on the first device 102, or a combination thereof.

The skin pathology mechanism 116 can be implemented in software running on specialized hardware, full hardware, or a combination thereof.

Based on analysis results, the compute system 100 can display information to the patient 112 including a recommendation based on the patient images 114, uploaded, for the patient 112 to schedule a visit with a primary care physician or with a specialist.

Continuing the example, the compute system 100 can provide a function that allows the clinician to access the patient images 114 uploaded by the patient 112 or for the patient 112 and the skin pathology mechanism 116, such as with the web-based dashboard. The compute system 100 allows the clinician to make edits to annotations determined by the skin pathology mechanism 116 and the scores (if necessary) and saves the results. The clinician can utilize the skin pathology mechanism 116 to make the diagnostic decision and suggest necessary treatment steps (if applicable).

Figure 2:
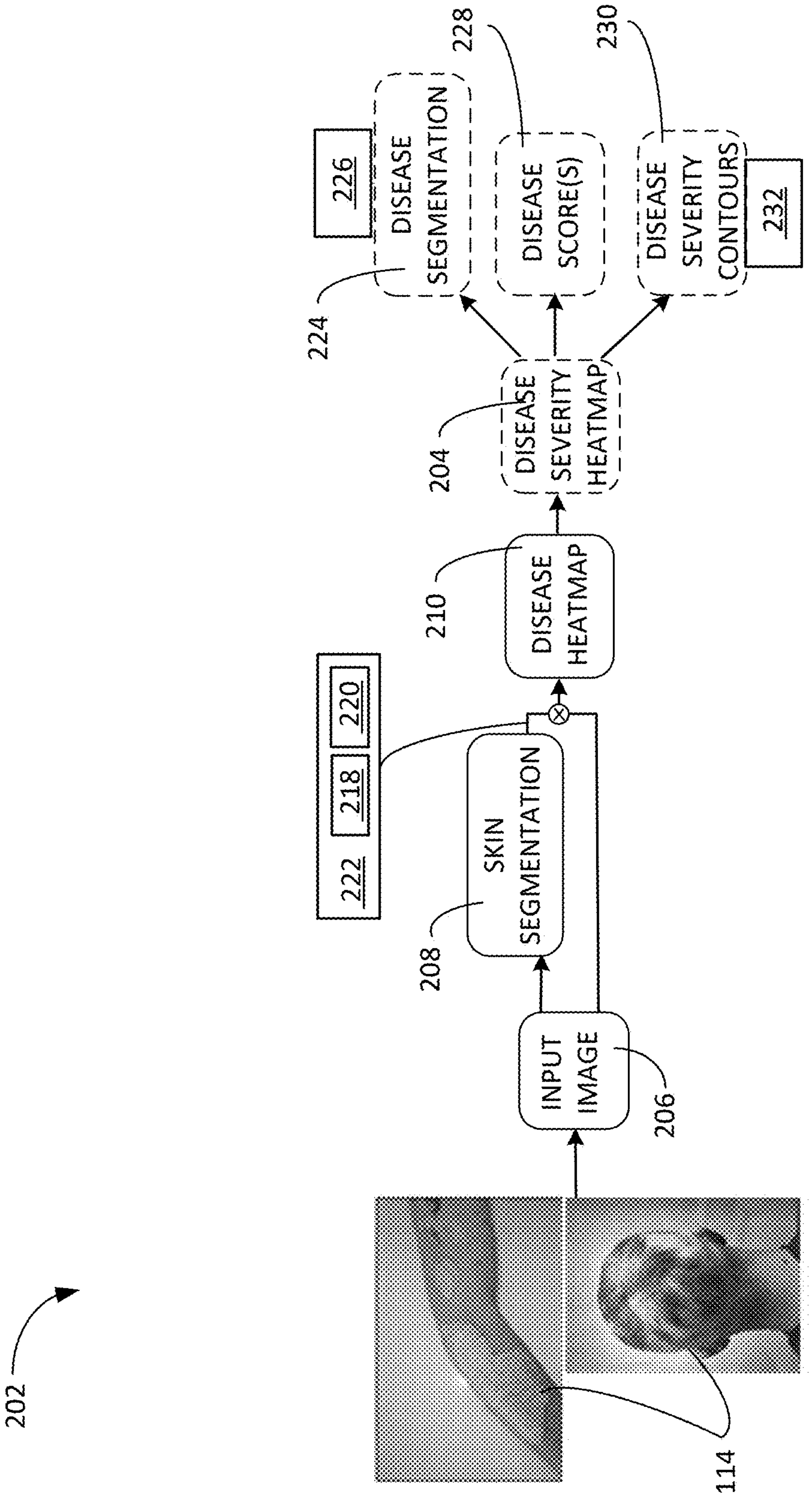
FIG. 2 is an example of a flow chart of a skin pathology mechanism utilizing a disease severity heatmap in a first embodiment.

Referring now to FIG. 2, therein is shown an example of a flow chart of a skin pathology mechanism 202 utilizing a disease severity heatmap 204 in a first embodiment. The skin pathology mechanism 202 can represent the skin pathology mechanism 116 of FIG. 1 and functioning with the compute system 100 of FIG. 1. In this example of the first embodiment, the skin pathology mechanism 202 can include an input image module 206, a skin segmentation module 208, a disease heatmap module 210, or at least a combination thereof. Also for example, some of the functions can be shown, such as a multiply symbol or the addition symbol, to denote functions but can be shown not integrated with or external to the modules mentioned earlier, partially or fully integrated into at least one of the modules, or at least a combination thereof. One or more embodiments can include other processing functions not explicitly shown in the FIG. 2 or other example embodiments in other figures.

In this example, the flow chart in FIG. 2 is shown flowing from the input image module 206 through the disease heatmap module 210, the as indicated by the arrows shown in FIG. 2 although order of the flow chart can differ. For example, the modules shown in FIG. 2 can be performed in different order and at different times, more than once, concurrently, simultaneously, sequentially, or a combination thereof with at least a portion of the modules in the flow chart shown in FIG. 2. Some of the variations will be described in the other embodiments below and as examples and not limited to the examples described.

Depending on the type of disease being analyzed for diagnostic purposes or to aid in diagnostic, the input image module 206 receives the patient images 114 of different types. As an example, each of the patient images 114 can represent a single image for the area or portion of the body of interest or can represent a number of images for a portion of the body or the fully body. Also for example, the patient images 114 can include a single type of disease or a multitude of diseases in one part or multiple parts of the body, Further for example, the patient images 114 can capture the same or different types of diseases. The examples shown in FIG. 2 depict multiple body parts as the patient images 114 but also a multitude of or differing types of diseases.

Examples of the inference flow for the first embodiments as well as other embodiments can be seen FIG. 2 and other flow chart of other embodiments. The application of the flow shown in FIG. 2 and the other flow charts in shown in other figures are flexible. For example, the skin segmentation can be used during pre-processing process or it can be the input of the heatmap model (whether the heatmap model is to generate a raw-heatmap or the disease severity heatmap); scores can be computed using/not using disease segmentation. Hence the position of boxes are not fixed as shown in other examples in FIG. 3, FIG. 4, FIG. 5, FIG. 6, and FIG. 7 as well as other embodiments not described as examples.

The input image module 206 can perform additional functions, such as quality checks for the patient images 114 being received. For example, the input image module 206 can check each of the patient images 114 for the brightness, luminosity, blurriness, or a combination thereof. If the instance of the patient images 114 does not pass the quality check, then the input image module 206 can provide a notification of the issue, a rejection, or a combination thereof of the instance of the patient images 114 of concern.

As an example, the input image module 206 can perform quality checks based on quality criteria including a blurry metric, a bad luminosity metric, or a combination thereof. Further as a specific example, the quality criteria can be a two-dimensional vector with the blurry metric, and the bad luminosity metric.

The blurry metric is used to measure the how clear or blurry the instance of the patient images 114 being processed is. The value for the blurry metric is set for the patient images 114 used for training the input image module 206 of what is considered clear and what is consider not clear or blurry. If the value of the blurry metric indicates that the patient image 114 is not clear or blurry, then the skin segmentation module 208, the disease heatmap module 210, or a combination thereof cannot analyze the instance of the patient images 114.

The bad luminosity metric is used to measure the lighting or brightness or dimness of the instance of the patient images 114 being processed. The value for bad luminosity metric is set for the patient images 114 used for training the input image module 206 of what is considered too dim and what is consider not dim. If the value of the bad luminosity metric indicates that the image is dim, then the skin segmentation module 208, the disease heatmap module 210, or a combination thereof cannot analyze the instance of the patient images 114.

The metrics of the quality criteria can be measured with a blurry threshold and a luminosity threshold collectively, as subsets, as equal priority, or of non-equal priority. The term equal priority refers to all the metrics are compared with equal weight to segregate the image match score 122 for the patient image 114 to be deemed acceptable and continue to be processed by the skin segmentation module 208. The term non-equal priority refers to the varying weight of the metrics relative to each other where some can have more importance over the other metrics. As an example, one of the metrics of the quality criteria alone can be used to determine if the instance of the patient images 114 is acceptable or not for the image to continue to be processed by the skin segmentation module 208.

As a specific example, the input image module 206 checks each of the instance of the patient images 114 and outputs a two-dimensional vector for the scores for the blurry metric, and the bad luminosity metric. The value for the bad luminosity metric can also represent the noise in the instance of the patient images 114 being processed.

Continuing with the specific example, the sum of output vector for the quality criteria does not need to be 1. There can be two high values at the same time: [99.6, 98.0] for the blurry metric, and the bad luminosity, respectively, which means the input image can be blurry or not clear and in bad light quality.

The blurry metric and the bad luminosity metric can be compared to the blurry threshold and the bad luminosity threshold, respectively. The value of the blurry metric that is greater than the blurry threshold can reject the instance of the patient images 114 as unacceptable and the bad luminosity metric that is greater than the bad luminosity threshold can reject the instance of the patient images 114 as unacceptable.

In other words, as an example, if the values for the blurry metric and the bad luminosity metric indicates bad light condition are lower than the blurry threshold and the bad luminosity threshold, respectively, then the input image module 206 accepts the input image or the instance of the patient images 114 being processed at the time. Otherwise, the input image or the instance of the patient images 114 being processed at the time will be classified into blurry if the value for the blurry metric is higher than the value for the bad luminosity metric and vice versa. Further, the metric (blurry metric or the bad luminosity metric) with the larger value can be used to provide feedback to improve performance of the compute system 100 if the input image module 206 rejects the image.

Continuing the example, the patient images 114 that are processed and determined by the input image module 206 to continue processing by the compute system 100 of FIG. 1, the skin segmentation module 208, the disease heatmap module 210, or at least a combination thereof, the flow can proceed from the input image module 206. In this example, the patient images 114 should include skin-related medical image.

The patient images 114 can be processed by the skin segmentation module 208 can generate a skin segmented output 222. The skin segmented output 222 can include a skin region 218 and a non-skin region 220. The skin segmentation module 208 can isolate, identify, or a combination thereof a skin region 218 from the background or from non-skin region 220 as part of the skin segment output 222. The non-skin region 220 can also optionally be included in the skin segmented output 222. The skin segmented output 222 can be utilized to ignore, filter, mask, or a combination thereof the portion or portions or each instance of the patient images 114 for the skin region 218 and optionally the non-skin region 220. The skin segmentation module 208 can segment the skin region 218 included eyes, nails, tattoo on skin, sick skin, for example psoriasis, skin tumors, etc. The skin segmentation module 208 does not optionally segment scalp unless the scalp is visible (i.e., there are not too much hair covering it).

The skin segmentation module 208 can ignore the object on skin such as clothes, bracelet, etc., which are examples of the non-skin region 220. However, the skin segmentation module 208 can still segment the visible skin under transparent objects, such as glasses. Other examples, the non-skin region 220 can also include other artifacts that can be included in the patient images 114 that are not related to the body or portion of the body, such as background portion of the body or body part, other extraneous items in the patient images 114, such as a table or a pet.

Further regarding the skin segmentation module 208, the skin segmentation module 208 can be trained with data sets that include variety in resolution images (both very closed up shot to wide shot). The data sets also includes images with very sick skin to normal skin in wide range of skin tone from white to darker skin. As an example, the training data set was annotated with a graphic editor to annotate skin and non-skin regions, even if the skin region is under a covering over the skin but still visible or at least partially visible. After annotation work, all the data set was double-checked by a test team to make sure that there was no error in the training set.

In an example, the skin data set includes 1402 images with smallest size of 192×127 pixels and maximum size of 4096×5462 pixels. The compute system 100 also performed input synthesis to enrich the training data set by resizing or random cropping each image to a size of 384×384 pixels and many other technique in augmentation of the data set during training, such as adding noise, adding brightness, rotating, flipping, shifting, or a combination thereof.

As noted earlier, the skin segmentation module 208 utilizes a U-net architecture. The U-net architecture is a convolutional neural network for segmentation of images. The U-net architecture provides an end-to-end approach taking in images to be analyzed and output segmented information for the images being analyzed.

As a specific example, the skin segmentation module 208 utilizes a U-net architecture, which includes a specific encoder-decoder scheme. The encoder reduces the spatial dimensions in every layer and increases the channels. On the other hand, the decoder increases the spatial dimensions while reducing the channels. As a specific example, the skin segmentation module 208 can be implemented with the U-net architecture found in Ronneberger, Olaf; Fischer, Philipp; Brox, Thomas (2015). "U-Net: Convolutional Networks for Biomedical Image Segmentation", which is herein incorporated by reference in its entirety.

The skin segmentation module 208 provides a scaling method to the U-net convolution neural network. The skin segmentation module 208 utilizes pre-trained model and utilizes transfer learning. The skin segmentation module 208 performs scaling by uniformly scales all dimensions of depth, width, and resolution using a compound coefficient. As an example, the skin segmentation module 208 includes 508 layers with 25.7 million parameters. As a specific example, the skin segmentation module 208 can be implemented with EfficientNet, an architecture for classification problem which is pre-trained on ImageNet data set, for the encoding part. Also as a specific example, the skin segmentation module 208 can be implemented with Markoff, John (19 Nov. 2012). "For Web Images, Creating New Technology to Seek and Find" The New York Times. Retrieved 3 Feb. 2018, which is herein incorporated by reference in its entirety.

The loss function plays an importance role in the training process. The loss function of the skin segmentation module 208 punish the model if it segments off lesion region as well as not does not segment skin area. An example of the loss function can be expressed below:

$$l(y, \hat{y}) = 1 - \frac{\sum_{i,j} f_1}{\sum_{i,j} f_2} \quad \text{Equation 5}$$

Where $f_1=1-(1-y_1)^k$, $f_2=1-(1-y_2)^h$, $y_1=y\hat{y}$, $y_2=(1-y)(1-\hat{y})$, h=2.5, k=2.5, y is the true label and ŷ is the prediction. The sum in the Equation 5 of the loss function l is taken over two indices: index i stands for the index of data sample $\{y_i\}_i$, index j stands for the component of the vector label $y_i=(y_{ij})_j$. This loss consider not only the mask (y and ŷ) but also in the inverse mask (1−y and 1−1−ŷ). By varying parameters h,k the modules that utilizes this loss function in the psoriasis diagnostic module 115 can have different version of this loss function for different purposes. For example, if the psoriasis diagnostic module 115 has a value with a lower k and increased value for h, the modules will increase the priority area of the pixels valued 1 (e.g. for the skin area or skin region) compared to the area of pixels valued 0 (e.g. for non-skin area or non-skin region). As an example, h=k=2.5 allows the modules to balance priority for the skin area compared to the non-skin area.

Referring to the disease heatmap module 210, in this example the disease heatmap module 210 generates the disease severity heatmap 204 based on the skin segmented output 222 and the patient images 114. Also for example, the disease heatmap module 210 or another function not integrated with the disease heatmap module 21 generates the disease severity score 228, the disease severity contour 230, or a combination thereof. As a specific example, the disease heatmap module 210 or another function not included in the disease heatmap module 210 in the skin pathology mechanism 202 can generate the disease severity score 228, the disease severity contour 230, or a combination thereof based on or from the disease severity heatmap 204.

The disease severity heatmap 204 highlights areas of concern for the instance of the patient images 114 that was analyzed with varying intensity based on severity. The disease heatmap module 210 or another function can generate the highlighted areas for the disease severity heatmap 204 based on the skin region 218, the skin segmented output 222, or a combination thereof. FIG. 2 depicts this filtering, masking, or a combination thereof with the skin region 218 or ignoring, masking out, or a combination thereof with the non-skin region 220 based on the function as depicted by a multiply symbol in FIG. 2. Similar functions are also performed based on the inputs to generate the corresponding output for the other embodiments shown throughout.

As an example, the multiply symbol represents a function whereby inputs to that symbol are combined to generate the output. For the example shown in FIG. 2, the multiply symbol is filtering or masking the skin region 218 as part of the skin segmented output 222 and the instance of the patient images 114 analyzed by the skin segmentation module 208. This allows the disease severity module 210, the skin pathology mechanism 202, or a combination thereof to generate the disease segmented output 224 for the skin region 218. As a specific example, the multiply symbol can represent a Point Y multiplication. Point Y multiplication refers to a process of multiplying a point on a graph (represented by coordinates "x, y") by a scalar value, which is scaling the point's position along the axes, where "y" specifically indicates that the y-coordinate of the point is being multiplied by the scalar value. The graph in this application would be the pixels of the patient images 114 being processed.

For illustrative purposes, the multiply function is shown in FIG. 2 as external or separate from the disease heatmap module 210, although it is understood that the partition of tasks can be different. As an example, the multiply symbol can be performed by a function implemented in hardware, software, or a combination thereof as part of the compute system 100 of FIG. 1. Also for example, the multiply function can be included as part of or integrated with the disease heatmap module 210. Further for example, the multiple function can be included in or integrated with the skin segmentation module 208.

As a specific example, the disease severity heatmap 204 is normalized to range between 0 and 1. For example, if the maximum disease severity is 4, pixel values in the instance of the patient images 114 being analyzed are divided by 4, ensuring that a value of 1 corresponds to severity 4.

When the disease being analyzed has more criteria to score (including disease segmentation), the model or the disease heatmap module 210 outputs multiple heatmaps at once, for example one instance of the disease severity heatmap 204 for each criteria. In this example, the disease heatmap module 210 can concurrently, simultaneously, or a combination thereof generate for the multiple criteria and its corresponding instance of the disease severity heatmap 204 and this process is a multi-tasking function and the disease heatmap module 210 is a multi-tasking model.

Similarly, the disease heatmap module 210 or another function not integrated with or external to the disease heatmap module 210 can also output or generate the disease segmented output 224, the disease score 228, the disease severity contour 230, or a combination thereof for each criteria, if there is more than one criteria then a number of them are generated one for one or one set for each criteria. Continuing this example, the disease heatmap module 210 can concurrently, simultaneously, sequentially, or a combination thereof generate for the multiple criteria and its corresponding instance of the disease severity heatmap 204 and this process can be a multi-tasking function. Similarly, the disease heatmap module 210 or another function not integrated with or external to the disease heatmap module 210 can concurrently, simultaneously, sequentially, or a combination thereof generate for the multiple criteria and its corresponding instance of the disease contour 230, the disease score 228, the disease segmented output 224, or a combination thereof and this process can also be a multi-tasking function.

Continuing this example for this embodiment that the disease heatmap module 210 processes the disease severity heatmap 204 or when multiple criteria exists then a plurality of the disease severity heatmap 204 (one for each criteria) are processed further to segment the disease-affected regions, identifying specific areas where the disease is present for the instance of the patient images 114 and referred to as the disease segmented output 224. To identify the affected region (or segment the disease or the disease segmented output 224), the disease heatmap module 210 utilizes a disease threshold 226. Any pixel with a value above the disease threshold 226 is considered part of the active disease and included in the affected region. The choice of the disease threshold 226 reflects the clinician's perspective for a disease score 228. The disease threshold 226 *t* can also represents the severity level at which the lesion is considered to be resolving. Different doctors have different value for the disease threshold 226 *t*.

The embodiments described and not included in this application can have different types and numbers of the disease threshold 226. The types of the disease threshold 226 can be represent different stages of a disease if that type of information is selected by a clinician, active or resolving indication, as well as other ways a clinician would want to tailor the visual output to aid in diagnosis. In contrast, traditional segmentation methods provide a fixed perspective, lacking the flexibility.

Continuing this example for this embodiment that the disease heatmap module 210 or a function not integrated with or external to the disease heatmap module 210 processes the disease severity heatmap 204 or when multiple criteria exists then a plurality of the disease severity heatmap 204 are processed to generate a numerical or categorical score, the disease score 228, representing the severity of the detected disease. There can be a multitude of the disease score 228 and one for each of the criteria for the disease identified, analyzed, or a combination thereof.

In this example, the disease heatmap module 210 or a function not integrated with or external to the disease heatmap module 210 converts the disease severity heatmap 204 to the disease score 228. The disease score 228 is a severity score of the instance of the patient images 114 being analyzed, generated, determined, or combination thereof by aggregating the severity values within the lesion, Continuing the example, the lesion can be identified, isolated, or a combination thereof from the disease severity heatmap 204.

To account for the sensitivity of the clinician, the disease threshold t is utilized, representing the severity level at which the lesion is considered to be resolving. The overall severity score S can then be computed as the average of the heatmap h or the disease severity heatmap 204 considering only pixels exceeding a certain value for the disease threshold 226 *t*. The computed S can be multiplied with the maximum severity value M. For example, the value of M can vary based on the type of disease or criteria for a type of disease, such as 4 for Psoriasis Area and Severity Index (PASI), 3 for Eczema Area and Severity Index (EASI).

As an example, the overall severity score S can then be computed as:

$$S = \frac{M\sum_i h(h_i > t)}{\sum_i h_i > t}$$

where M is maximum severity value (for example, 4 for Psoriasis Area and Severity Index (PASI), 3 for Eczema Area and Severity Index (EASI)), hi is heatmap value (the disease severity heatmap 204) of pixel i.

As an example to illustrate the effectiveness and improvements of the invention, various embodiments are described as examples, each highlighting its capabilities in addressing key challenges that are precision and explainability.

As a specific example, the conversion from the disease severity heatmap 204 to the disease score 228 can be performed one-way. In this specific example, a different approach that directly outputs a score for the disease score 228 from an input image or an instance of the patient images 114 cannot generate a severity heatmap for the disease severity heatmap 204. This is because score-based models produce an overall average score for the entire image rather than assigning severity to individual pixels. In contrast, the invention and the embodiments described as examples allow for computing the disease severity or the disease score 228 of any selected region by averaging the severity values of all pixels within that area, the skin region 218, the disease segmented output 224, or a combination thereof.

Continuing this example for this embodiment that the disease heatmap module 210 or a function not integrated with or external to the disease heatmap module 210 processes the disease severity heatmap 204 or when multiple criteria exists for the type of disease then a plurality of the disease severity heatmap 204 are processed to generate contour maps, referred to as the disease severity contour 230, for better clinical usability and customization based on physician preferences. There can be a multitude of the disease severity contour 230 where one is for each of the criteria for the disease identified, analyzed, or a combination thereof. Converting heatmaps, each of the disease severity heatmap 204, into contour-based representations, or the disease severity contour 230, preserves the lesion's visual clarity while delineating severity levels, ensuring that scoring, or the disease score 228, remains interpretable and clinically actionable.

In other words, the disease heatmap module 210 or a function not integrated with or external to the disease heatmap module 210 generates visual outlines marking the affected regions, the skin region 218, the disease segmented output 224, the patient images 114, or a combination thereof with the disease score 228 to highlight the spread and intensity of the disease. The output format (instead of a heatmap or the disease severity heatmap 204) is to ease the understanding for the clinicians, by highlighting directly on the original image or the instance of the patient images 114 the severe areas with a simple color code (from green to red for example). As an example, if the generates 4 contours levels, with the corresponding contour thresholds 232 and illustrated in other figures.

Figure 3:
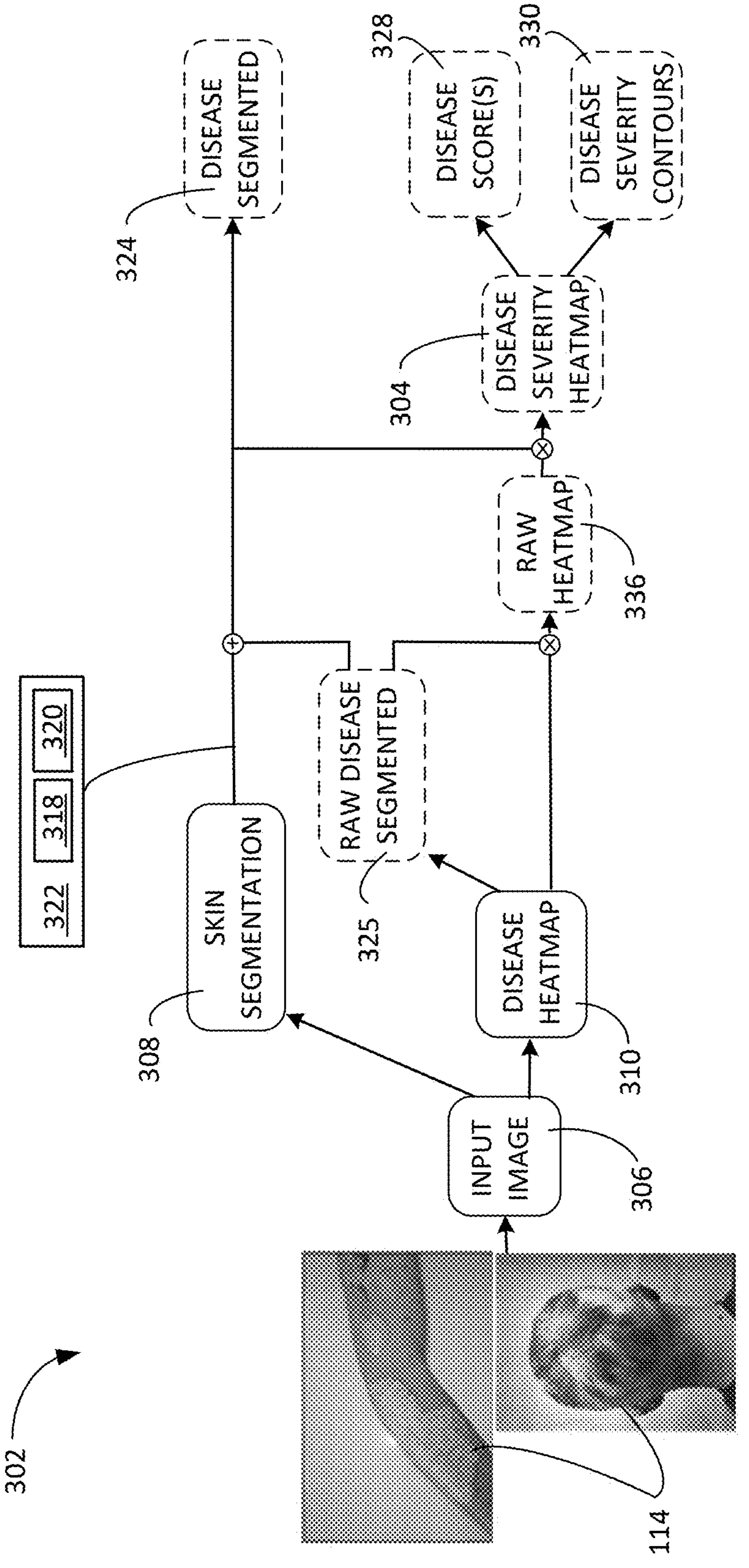
FIG. 3 is an example of a flow chart of a skin pathology mechanism utilizing a disease severity heatmap in a second embodiment.

Referring now to FIG. 3, therein is shown an example of a flow chart of a skin pathology mechanism 302 utilizing a disease severity heatmap 304 in a second embodiment. The skin pathology mechanism 302 can represent the skin pathology mechanism 116 of FIG. 1 and functioning with the compute system 100 of FIG. 1.

In this example of the second embodiment, the skin pathology mechanism 302 can include an input image module 306, a skin segmentation module 308, a disease heatmap module 310, or at least a combination thereof. Also for example, some of the functions can be shown, such as a multiply symbol or the addition symbol, to denote functions but can be shown not integrated with or external to the modules mentioned earlier, partially or fully integrated into at least one of the modules, or at least a combination thereof. One or more embodiments can include other processing functions described and not explicitly shown in the FIG. 3 or other example embodiments in other figures.

For brevity, if a module or a symbol is shown in FIG. 3 or a function not described or as described as in other figures and embodiments, the description in previous or later embodiments are applicable and are examples. For example, the input image module 306 and the skin segmentation module 308 are not described for FIG. 3 for brevity. Also for example, the multiply symbol, or the processing for the skin pathology mechanism 302 beyond modules shown can be described in this figure and can be supplemented by the descriptions in other figures and embodiments.

FIG. 3 depicts another example of the inference flow of heatmap approach. In this example, the heatmap model or the disease heatmap module 310 outputs or generates a raw disease segmented output 325 and provide an input to generate a raw heatmap 336, which can be considered a pre-heatmap. The raw disease segmented output 325 is considered a pre-heatmap at least because the raw disease segmented output 325 is not filtered or masked by the skin region 318. The raw disease segmented output 325 is generated without the input of or is not based on the skin segmented output 322. In this example, the disease heatmap module 310 is performing a multi-task function by outputting or generating the raw disease segmented output 325 and a raw output as an input to the multiply symbol to generate the raw heatmap 336, concurrently, simultaneously, sequentially, or a combination thereof or at least a portion of the generation process by the disease heatmap module 310.

Continuing the example, the skin pathology mechanism 302 processes the skin segmented output 322 from the skin segmentation module 308 and the raw disease segmented output 325 to generate the disease segmented output 324. The disease segmented output 324 ignores or filters out the non-skin region 320 and not affected areas from the patient images 114 being processed As a more specific example, FIG. 3 depicts an addition symbol representing that the skin pathology mechanism 302 is adding or overlaying the skin segmented output 322 and the raw disease segmented output 325 to generate the disease segmented output 324, which is based on the skin segmented output 322, the raw disease segmented output 325, or a combination thereof.

FIG. 3 depicts the multiply function with a multiply symbol. The raw heatmap 336 is based on the raw disease segmented output 325, the raw output of the disease heatmap module 310, or a combination thereof. As a specific example, the raw output generated from the disease heatmap module 310 is an input to the multiply symbol along with the raw disease segmented output 325. The multiply symbol generates the raw heatmap 336. The function of the multiply symbol is described in other figure(s). Also, the number of inputs, the type of inputs, or a combination thereof the output is based on the function described in its respective figures. The integration, partial-integration, external relationship of the multiply function in relationship to the modules shown in FIG. 3 are similarly described in other figure(s).

Continuing the example, the disease severity heatmap 304 is based on the raw heatmap 336 and the disease segmented output 324. As a specific example, the disease severity heatmap 304 is an output generated from a multiply function illustrated by a multiplication symbol. The input to the multiple symbol in this figure is the raw heatmap 336, the disease segmented output 324, or at least a combination thereof.

In this example, the disease severity heatmap 304 provides a filtered version or masked out from of the raw heatmap 336 that reflects the affected areas with disease because the raw heatmap 336 is generated including information from the raw disease segmented output 325. Also in this example, the disease severity heatmap 304 provides a filtered version or masked out for the skin-region 318 because the disease segmented output 324 includes information based on or from the skin segmented output 308, the raw disease segmented output 325, or a combination thereof.

Continuing this example, the skin pathology mechanism 302 generates a disease score 328, a disease severity contour 330, or at least a combination thereof. The skin pathology mechanism 302 can perform a multi-task function by outputting or generating the disease segmented output 324, the disease score 328, the disease severity contour 330, or at least a combination thereof concurrently, simultaneously, or a combination thereof or at least a portion of the generation process.

As a specific example, the disease score 328, the disease severity contour 330, or a combination thereof based on outputs from the skin segmentation module 325, the disease heatmap module 310, or at least a combination thereof. The disease score 328, the disease severity contour 330, or a combination thereof can also be based on the outputs generated by the addition symbol and multiply symbols. As a specific example, the skin pathology mechanism 302 can generate the disease severity score 328, the disease severity contour 330, or a combination thereof based on or from the disease severity heatmap 304.

Also for example, if the disease being analyzed has more than one criteria, the skin pathology mechanism 302 can generate a number of outputs with a set for each criteria. For example, one set of the disease segmented output 324, the disease score 328, the disease severity contour 330, or a combination thereof can be generated for each of the criteria. Also, some of the intermediate output can be generated for each of the criteria, such as the raw heatmap 336, the raw output from the disease heatmap module 310, the raw disease segmented output 325, or a combination thereof.

The skin segment output 322 can be common across the different criteria or one can be generated for each criteria depending on whether the disease being analyzed can have different areas of the patient images 114 or the skin region 318 to highlight or ignore. For example, if a disease ailment inflicts subset portion of the body, those body portions can be identified for the skin region 318 to be analyzed for that particular skin disease and some skin areas in non-inflicted body parts would not be analyzed and can be classed of the non-skin region 320 for this purpose or identified as no-interest form of area.

Figure 4:
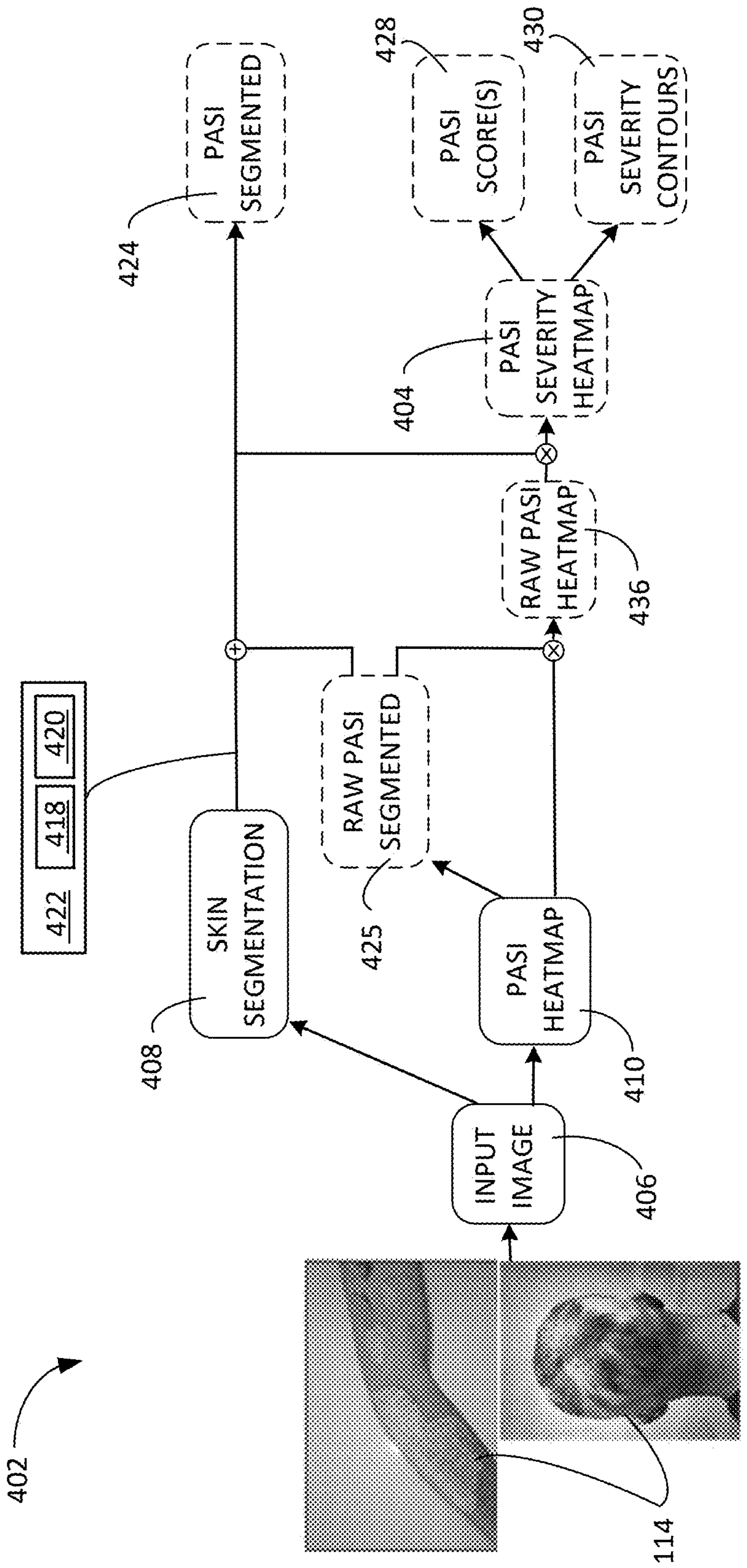
FIG. 4 is an example of a flow chart of a skin pathology mechanism utilizing a disease severity heatmap for an application for psoriasis in a third embodiment.

Referring now to FIG. 4, therein is shown an example of a flow chart of a skin pathology mechanism 402 utilizing a disease severity heatmap 404 for an application for psoriasis in a third embodiment. The skin pathology mechanism 402 can represent the skin pathology mechanism 116 of FIG. 1 and functioning with the compute system 100 of FIG. 1.

In this example of the third embodiment, the skin pathology mechanism 402 can include an input image module 406, a skin segmentation module 408, a disease heatmap module 410 (labeled in FIG. 4 as the PASI Heatmap), or at least a combination thereof. Also for example, some of the functions can be shown, such as a multiply symbol or the addition symbol, to denote functions but can be shown not integrated with or external to the modules mentioned earlier, partially or fully integrated into at least one of the modules, or at least a combination thereof. One or more embodiments can include other processing functions described and not explicitly shown in the FIG. 4 or other example embodiments in other figures.

For brevity, if a module or a symbol is shown in FIG. 4 or a function not described or as described as in other figures and embodiments, the description in previous or later embodiments are applicable and are examples. For example, the input image module 406 and the skin segmentation module 408 are not described for FIG. 4 for brevity. For the skin segmentation module 408, the skin segmented output 422, the skin region 418, and the non-skin region 420, are also not described in FIG. 4. Also for example, the multiply symbol, or the processing for the skin pathology mechanism 402 beyond modules shown can be described in this figure and can be supplemented by the descriptions in other figures and embodiments.

FIG. 4 depicts another example of the inference flow of heatmap approach. In this example, the heatmap model or the disease heatmap module 410 outputs or generates a raw disease segmented output 425 and provide an input to generate a raw heatmap 436, which can be considered a pre-heatmap. The raw disease segmented output 425 is considered a pre-heatmap at least because the raw disease segmented output 425 is not filtered or masked by the skin region 418. The raw disease segmented output 425 is generated without the input of or is not based on the skin segmented output 422. In this example, the disease heatmap module 410 is performing a multi-task function by outputting or generating the raw disease segmented output 425 and a raw output as an input to the multiply symbol to generate the raw heatmap 436, concurrently, simultaneously, sequentially, or a combination thereof or at least a portion of the generation process by the disease heatmap module 410.

Continuing the example, the skin pathology mechanism 402 processes the skin segmented output 422 from the skin segmentation module 408 and the raw disease segmented output 425 (labeled in FIG. 4 as Raw PASI Heatmap) to generate the disease segmented output 424 (labeled in FIG. 4 as PASI Segmented). The disease segmented output 424 ignores or filters out the non-skin region 420 and not affected areas from the patient images 114 being processed As a more specific example, FIG. 4 depicts an addition symbol representing that the skin pathology mechanism 402 is adding or overlaying the skin segmented output 422 and the raw disease segmented output 425 to generate the disease segmented output 424, which is based on the skin segmented output 422, the raw disease segmented output 425, or a combination thereof.

FIG. 4 depicts the multiply function with a multiply symbol. The raw heatmap 436 is based on the raw disease segmented output 425, the raw output of the disease heatmap module 410, or a combination thereof. As a specific example, the raw output generated from the disease heatmap module 410 is an input to the multiply symbol along with the raw disease segmented output 425. The multiply symbol generates the raw heatmap 436. The function of the multiply symbol is described in other figure(s). Also, the number of inputs, the type of inputs, or a combination thereof the output is based on the function described in its respective figures. The integration, partial-integration, external relationship of the multiply function in relationship to the modules shown in FIG. 4 are similarly described in other figure(s). The multiplication function is described a previous figure.

Continuing the example, the disease severity heatmap 404 (labeled in FIG. 4 as PSAI Severity Heatmap) is based on the raw heatmap 436 and the disease segmented output 424. As a specific example, the disease severity heatmap 404 is an output generated from a multiply function illustrated by a multiplication symbol. The input to the multiple symbol in this figure is the raw heatmap 436, the disease segmented output 424, or at least a combination thereof.

In this example, the disease severity heatmap 404 provides a filtered version or masked out from of the raw heatmap 436 that reflects the affected areas with disease because the raw heatmap 436 is generated including information from the raw disease segmented output 425. Also in this example, the disease severity heatmap 404 provides a filtered version or masked out for the skin-region 418 because the disease segmented output 424 includes information based on or from the skin segmented output 408, the raw disease segmented output 425, or a combination thereof.

Continuing this example, the skin pathology mechanism 402 generates a disease score 428, a disease severity contour 430, or at least a combination thereof. The skin pathology mechanism 402 can perform a multi-task function by outputting or generating the disease segmented output 424, the disease score 428, the disease severity contour 430, or at least a combination thereof concurrently, simultaneously, or a combination thereof or at least a portion of the generation process.

As a specific example, the disease score 428, the disease severity contour 430, or a combination thereof based on outputs from the skin segmentation module 425, the disease heatmap module 410, or at least a combination thereof. The disease score 428, the disease severity contour 430, or a combination thereof can also be based on the outputs generated by the addition symbol and multiply symbols. As a specific example, the skin pathology mechanism 402 can generate the disease severity score 428, the disease severity contour 430, or a combination thereof based on or from the disease severity heatmap 404.

Also for example, if the disease being analyzed has more than one criteria, the skin pathology mechanism 402 can generate a number of outputs with a set for each criteria. For example, one set of the disease segmented output 424, the disease score 428, the disease severity contour 430, or a combination thereof can be generated for each of the criteria. Also, some of the intermediate output can be generated for each of the criteria, such as the raw heatmap 436, the raw output from the disease heatmap module 410, the raw disease segmented output 425, or a combination thereof.

The skin segment output 422 can be common across the different criteria or one can be generated for each criteria depending on whether the disease being analyzed can have different areas of the patient images 114 or the skin region 418 to highlight or ignore. For example, if a disease ailment inflicts subset portion of the body, those body portions can be identified for the skin region 418 to be analyzed for that particular skin disease and some skin areas in non-inflicted body parts would not be analyzed and can be classed of the non-skin region 420 for this purpose or identified as no-interest form of area.

Figure 5:
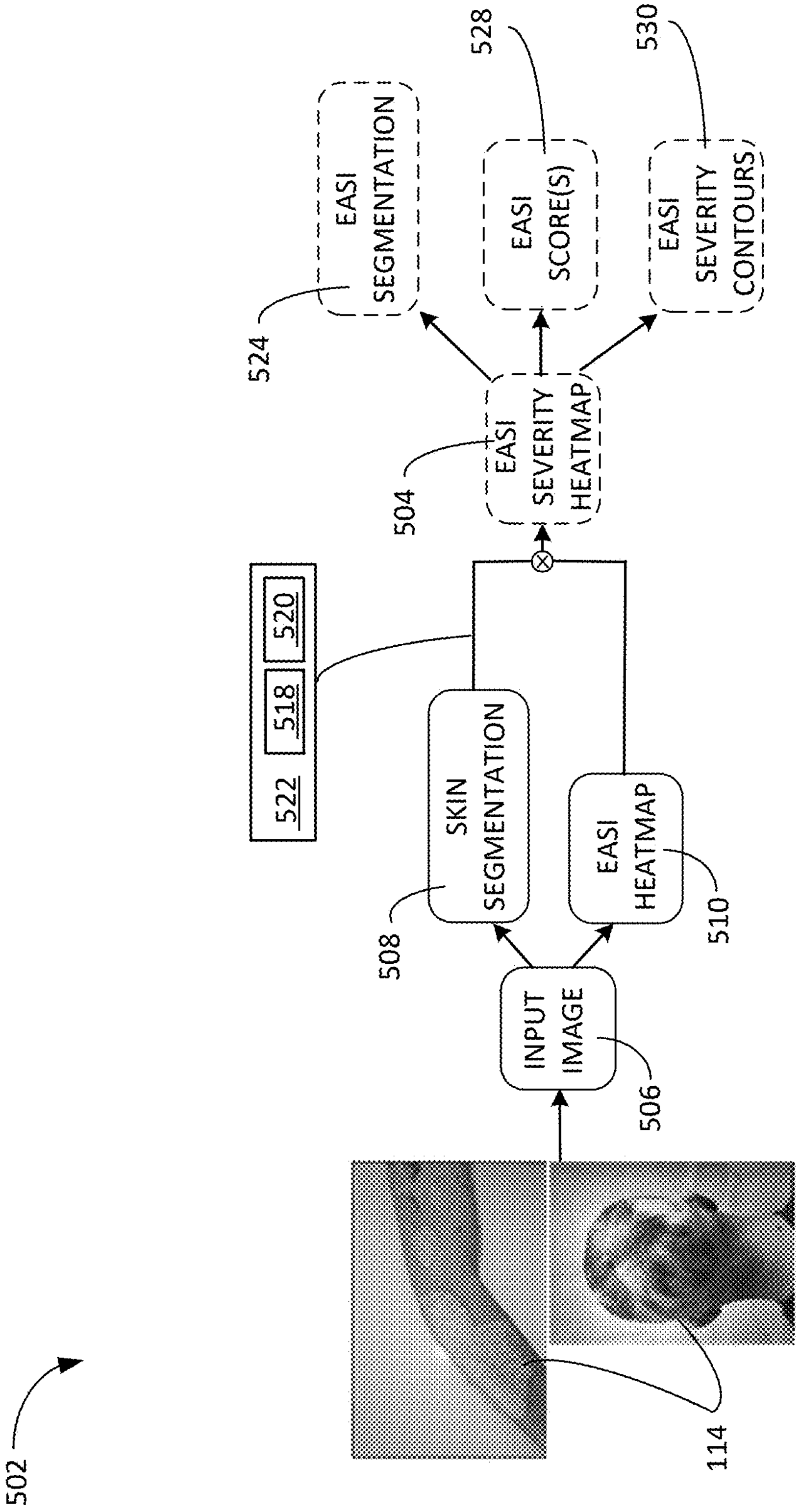
FIG. 5 is an example of a flow chart of a skin pathology mechanism utilizing a disease severity heatmap for an application for eczema in a fourth embodiment.

Referring now to FIG. 5, therein is shown an example of a flow chart of a skin pathology mechanism 502 utilizing a disease severity heatmap 504 for an application for eczema in a fourth embodiment. The skin pathology mechanism 502 can represent the skin pathology mechanism 116 of FIG. 1 and functioning with the compute system 100 of FIG. 1. In this example of the fourth embodiment, the skin pathology mechanism 502 can include an input image module 506, a skin segmentation module 508, a disease heatmap module 510 (labeled in FIG. 5 as EASI Heatmap), or a combination thereof.

For brevity, if a module is shown in FIG. 5 and is not described, the description in previous or later embodiments are applicable and are examples. For example, the input image module 506, and the skin segmentation module 508 are not described for FIG. 5 for brevity. For the skin segmentation module 508, the skin segmented output 522, the skin region 518, and the non-skin region 520, are also not described in FIG. 5. Also for brevity, a disease segmented output 524 (labeled in FIG. 5 as EASI Segmentation), a disease score 528 (labeled in FIG. 5 as EASI Score), and a disease severity contour 530 (labeled in FIG. 5 as EASI Severity Contours) are not described in detail. Architecturally, the example of the skin pathology mechanism 502 flows similarly to the skin pathology mechanism 202 of FIG. 2 except as noted early and for Eczema Area and Severity Index (EASI) assessment.

Also for example, the multiply symbol, or the processing for the skin pathology mechanism 302 beyond modules shown can be described in this figure and can be supplemented by the descriptions in other figures and embodiments. FIG. 5 depicts an example where the skin pathology mechanism 502 generates the disease segmented output 524, the disease score 528, the disease severity contour 530, or a combination thereof based on or from the disease severity heatmap 504.

Figure 6:
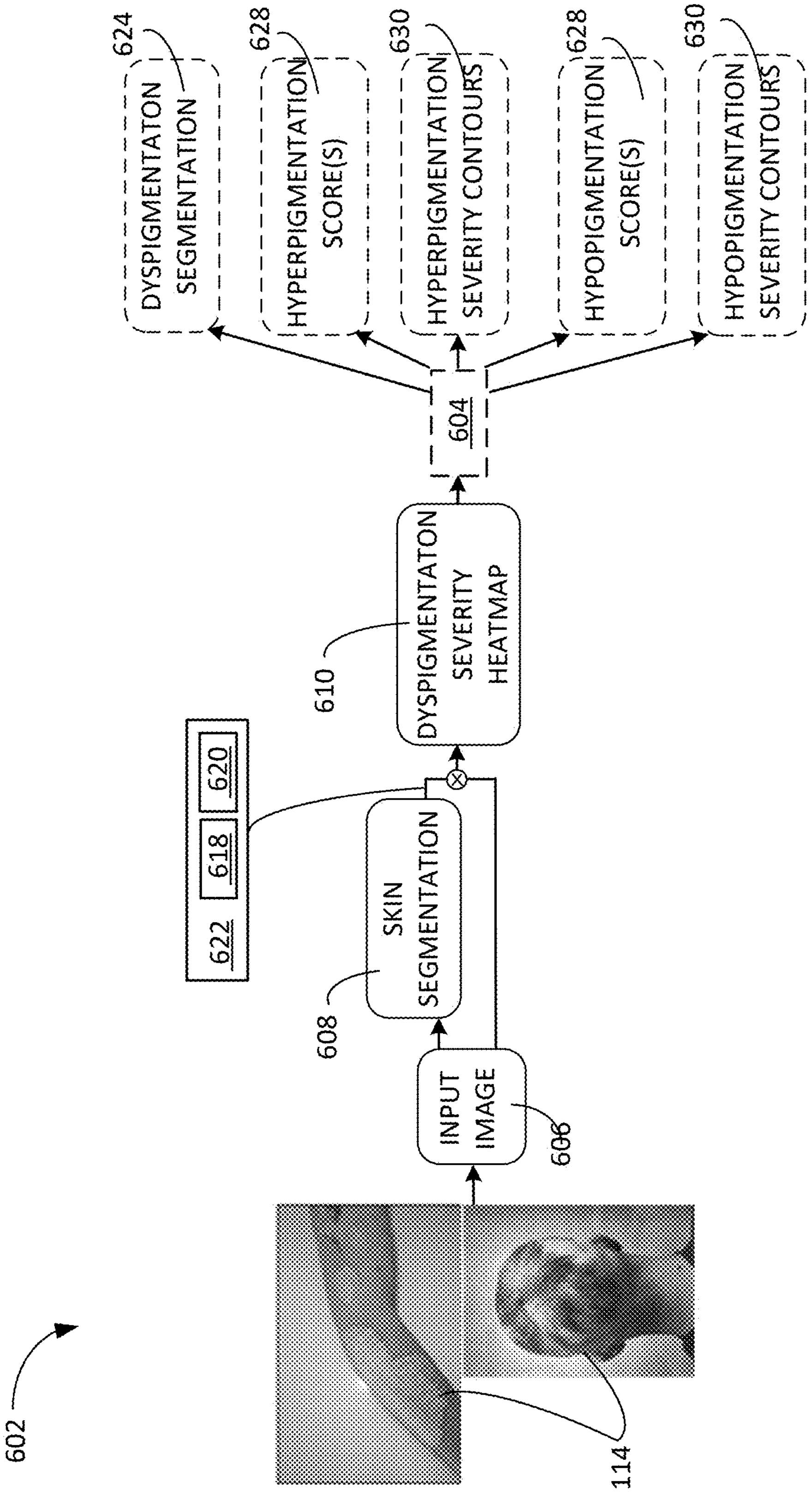
FIG. 6 is an example of a flow chart of a skin pathology mechanism utilizing a disease severity heatmap for an application for dyspigmentation in a fifth embodiment.

Referring now to FIG. 6, therein is shown an example of a flow chart of a skin pathology mechanism 602 utilizing a disease severity heatmap 604 for an application for dyspigmentation in a fifth embodiment. The skin pathology mechanism 602 can represent the skin pathology mechanism 116 of FIG. 1 and functioning with the compute system 100 of FIG. 1.

In this example of the fifth embodiment, the skin pathology mechanism 602 can include an input image module 606, a skin segmentation module 608, a disease heatmap module 610 (labeled in FIG. 6 as Dyspigmentation Severity Heatmap), or a combination thereof. Also for example, some of the functions can be shown, such as a multiply symbol, to denote functions but can be shown not integrated with or external to the modules mentioned earlier, partially or fully integrated into at least one of the modules, or at least a combination thereof. One or more embodiments can include other processing functions described and not explicitly shown in the FIG. 6 or other example embodiments in other figures.

For brevity, if a module is shown in FIG. 6 and is not described, the description in previous or later embodiments are applicable and are examples. For example, the input image module 606, and the skin segmentation module 608 are not described for FIG. 6 for brevity. For the skin segmentation module 608, the skin segmented output 622, the skin region 618, and the non-skin region 620, are also not described in FIG. 6. Also for example, the multiply symbol, or the processing for the skin pathology mechanism 602 beyond modules shown can be described in this figure and can be supplemented by the descriptions in other figures and embodiments.

Also for brevity, the disease heatmap module 610 generates a disease score 628 for each criteria (labeled in FIG. 6 as Hyperpigmentation Score and Hypopigmentation Score), a disease severity contour 630 for each criteria (labeled in FIG. 6 as Hyperpigmentation Severity Contours and Hypopigmentation Severity Contours), a disease segmented output 624 (labeled in FIG. 6 as Dyspigmentation Segmentation), or a combination thereof and are not described in detail. FIG. 6 shows an example where one instance of the disease segmented output 624 can be utilized for both the hyper- and hypo-pigmentation, although separate instances for the disease segmented output 624 can be generated one for hyper- and one for hypo-criteria. Architecturally, the example of the skin pathology mechanism 602 flows similarly to the skin pathology mechanism 202 of FIG. 2 except as noted early and dyspigmentation assessment.

Figure 7:
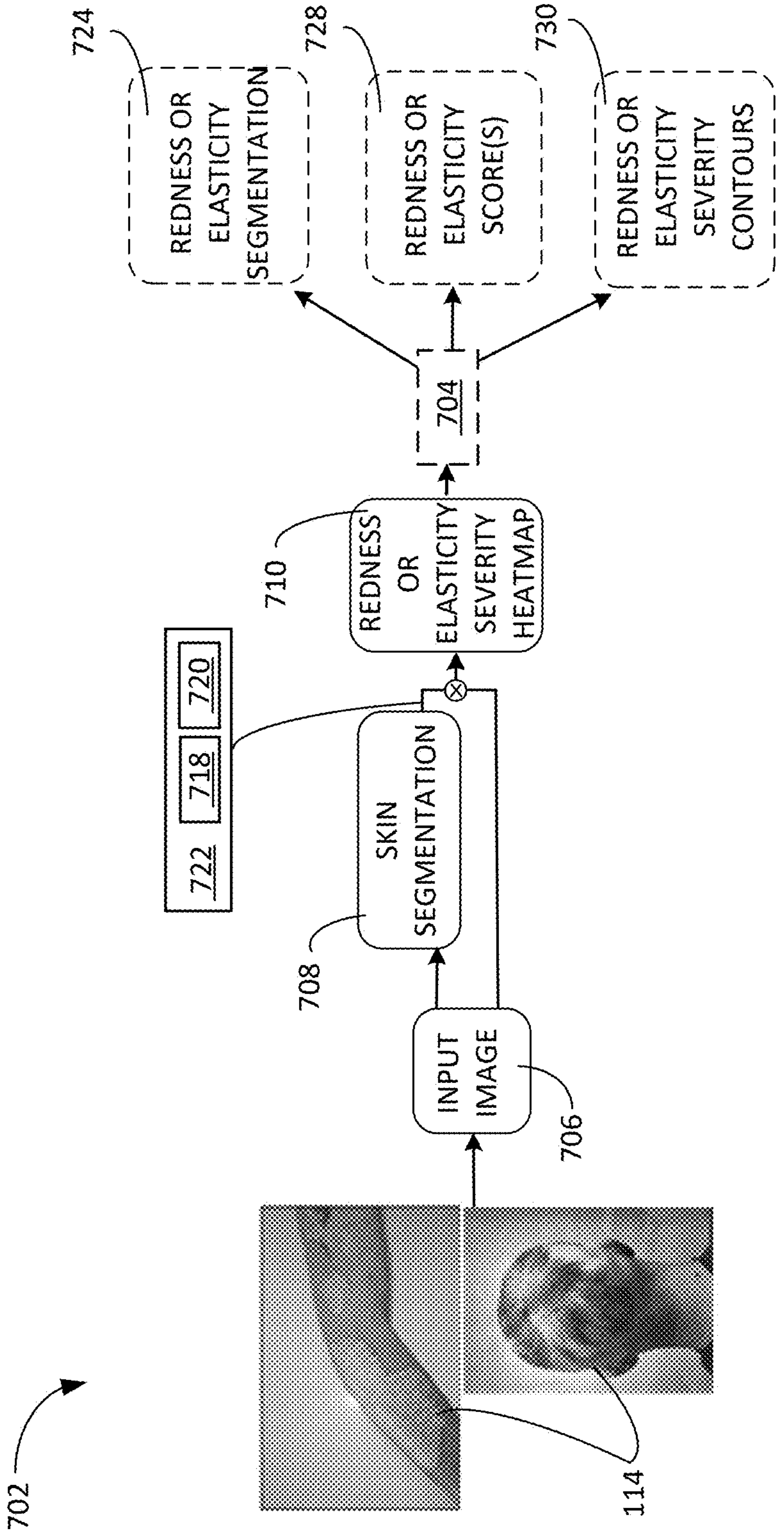
FIG. 7 is an example of a flow chart of a skin pathology mechanism utilizing a disease severity heatmap for an application in a sixth embodiment.

Referring now to FIG. 7, therein is shown an example of a flow chart of a skin pathology mechanism 702 utilizing a disease severity heatmap 704 for an application in a sixth embodiment. The skin pathology mechanism 702 can represent the skin pathology mechanism 116 of FIG. 1 and functioning with the compute system 100 of FIG. 1.

In this example of the sixth embodiment, the skin pathology mechanism 702 can include an input image module 706, a skin segmentation module 708, a disease heatmap module 710 (labeled in FIG. 7 as Redness or Elasticity Severity Heatmap), or a combination thereof. Also for example, some of the functions can be shown, such as a multiply symbol, to denote functions but can be shown not integrated with or external to the modules mentioned earlier, partially or fully integrated into at least one of the modules, or at least a combination thereof. One or more embodiments can include other processing functions described and not explicitly shown in the FIG. 7 or other example embodiments in other figures.

For brevity, if a module is shown in FIG. 7 and is not described, the description in previous or later embodiments are applicable and are examples. For example, the input image module 706, and the skin segmentation module 708 are not described for FIG. 7 for brevity. For the skin segmentation module 708, the skin segmented output 722, the skin region 718, and the non-skin region 720, are also not described in FIG. 7. Also for example, the multiply symbol, or the processing for the skin pathology mechanism 702 beyond modules shown can be described in this figure and can be supplemented by the descriptions in other figures and embodiments.

Also for brevity, a disease score 728 (labeled in FIG. 7 as Redness or Elasticity Score) and a disease severity contour 730 (labeled in FIG. 7 as Redness or Elasticity Severity Contours) are not described in detail. Architecturally, the example of the skin pathology mechanism 702 flows similarly to the skin pathology mechanism 202 of FIG. 2 except as noted early and redness or elasticity assessment.

Figure 8:
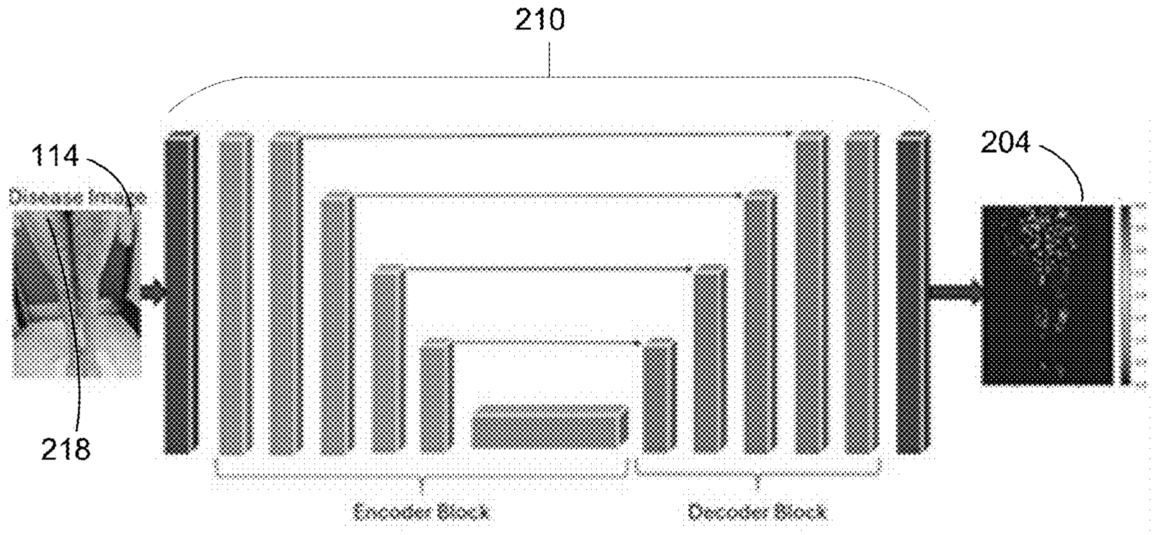
FIG. 8 is an example of a portion of the architecture for the skin pathology mechanism for an embodiment.

Referring now to FIG. 8, therein is shown an example of a portion of the architecture for the skin pathology mechanism 202 of FIG. 2 for an embodiment. FIG. 8 can also represent a portion of the architecture for the other embodiments described as well as other embodiments that have not been described. As a specific example, FIG. 8 depicts of an architecture of the heatmap model or the disease heatmap module 210 or at least a portion of the architecture.

FIG. 8 depicts an example where one instance of the patient images 114 being analyzed by the skin pathology mechanism 202, which generates the disease severity heatmap 204. This example shows the input as a picture of two legs with some skin coloration that appears to be different than the rest of the skin. The disease severity heatmap 204 depicts an outline of the legs as well as the skin region 218 based on the skin segmented output 222 of FIG. 2. The disease severity heatmap 204 also depicts different colors as a heatmap noting the severity level of a skin disease base on the colors.

To train the disease heatmap module 210 as an example, every image in the training set will have one corresponding heatmap severity or the disease severity heatmap 204 which visually represent severity levels based on predefined clinical criteria (e.g., erythema intensity, desquamation, etc.). Each pixel of a heatmap image or the disease severity heatmap 204 has a value which is from 0 to 1 (1 for highest severity and 0 for non-affected area). The disease heatmap module 210 is trained using Unet type network.

This is a pixelwise regression problem and pixelwise regression is a method of analyzing images by using regression analysis on individual pixels. To resolve this problem, the network encodes the image through a series of layers applying convolution kernels through the encoding process, resulting in a vectorization of the image in the so called latent space. This latent space features the wanted characteristics of the image and are then decoded by the inverse operation of the encoding process (shown in FIG. 8 for FIG. 2 and FIG. 9 for FIG. 3). Here the wanted characteristics are the severity levels of each pixels of the skin disease image. The encoding-decoding process attributes a value from 0 to 1 to each individual pixels. The output of the network with this assigned process is then a heatmap given the severity of the disease (or the disease severity heatmap 204) or any associated feature (e.g. redness).

In the inference phase, superimposing heatmaps or the disease severity heatmap 204 on the original image can obscure lesion details, potentially hindering assessment. To address this, the skin pathology mechanism 202 of FIG. 2, the disease heatmap module 210 of FIG. 2, or a combination thereof converts heatmaps or the disease severity heatmap 204 into contour-based representations or the disease severity contour 230 of FIG. 2, preserving the lesion's visual clarity while delineating severity levels, ensuring that scoring remains interpretable and clinically actionable (shown in FIG. 10 and FIG. 11).

Figure 9:
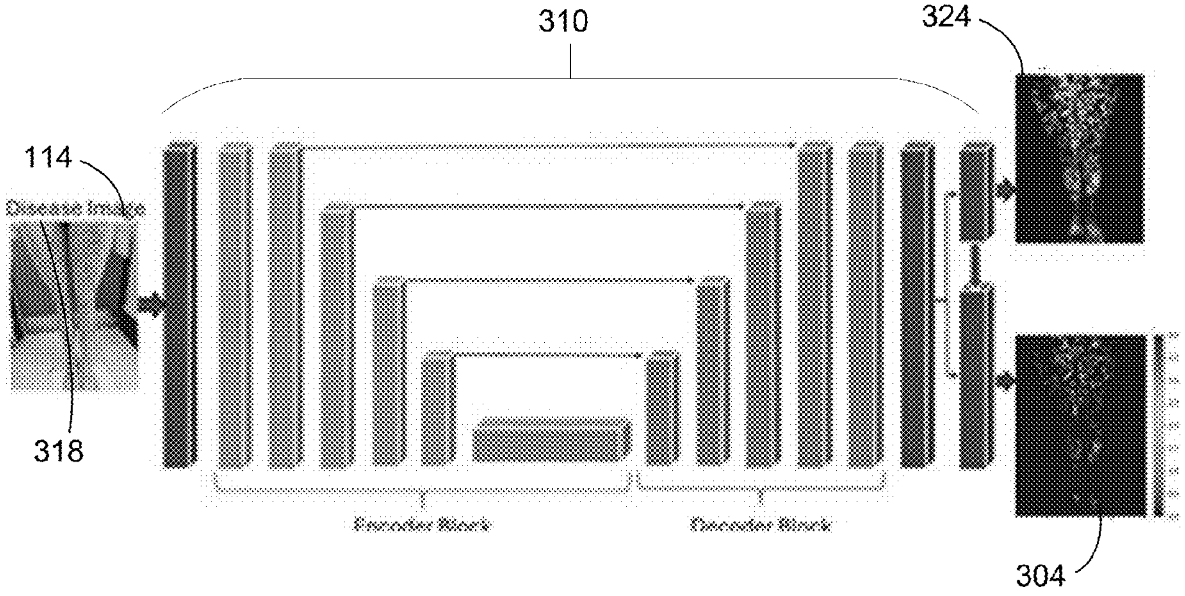
FIG. 9 is an example of a portion of the architecture for the skin pathology mechanism for an embodiment.

Referring now to FIG. 9, therein is shown an example of a portion of the architecture for the skin pathology mechanism 302 of FIG. 3 for an embodiment. FIG. 9 can also represent a portion of the architecture for the other embodiments described as well as other embodiments that have not been described. As a specific example, FIG. 9 depicts of an architecture of the heatmap model or the disease heatmap module 310.

FIG. 9 depicts an example where one instance of the patient images 114 being analyzed by the skin pathology mechanism 302, which generates the disease segmented output 324, the disease severity heatmap 304, or a combination thereof. This example shows the input as a picture of two legs with some skin coloration that appears to be different than the rest of the skin. The disease severity heatmap 304 depicts an outline of the legs as well as the skin region 318. The disease segmented output 324 also depicts an outline of the legs. The disease severity heatmap 304 depicts different colors as a heatmap noting the severity level of a skin disease base on the colors.

To train the disease heatmap module 310 as an example, every image in the training set will have one corresponding heatmap severity or the disease severity heatmap 304 which visually represent severity levels based on predefined clinical criteria (e.g., erythema intensity, desquamation, etc.). Each pixel of a heatmap image or the disease severity heatmap 304 has a value which is from 0 to 1 (1 for highest severity and 0 for non-affected area). The disease heatmap module 310 is trained using Unet type network. This is a pixelwise regression problem. To resolve this problem, the network encodes the image through a series of layers applying convolution kernels through the encoding process, resulting in a vectorization of the image in the so called latent space. This latent space features the wanted characteristics of the image and are then decoded by the inverse operation of the encoding process (shown in FIG. 8 for FIG. 2 and FIG. 9 for FIG. 3). Here the wanted characteristics are the severity levels of each pixels of the skin disease image. The encoding-decoding process attributes a value from 0 to 1 to each individual pixels. The output of the network with this assigned process is then a heatmap given the severity of the disease or any associated feature (e.g. redness).

In the inference phase, superimposing heatmaps or the disease severity heatmap 304 on the original image can obscure lesion details, potentially hindering assessment. To address this, the skin pathology mechanism 302 of FIG. 3, the disease heatmap module 310, or a combination thereof converts heatmaps or the disease severity heatmap 304 into contour-based representations or the disease severity contour 330 of FIG. 3, preserving the lesion's visual clarity while delineating severity levels, ensuring that scoring remains interpretable and clinically actionable (shown in FIG. 10 and FIG. 11).

Figure 10:
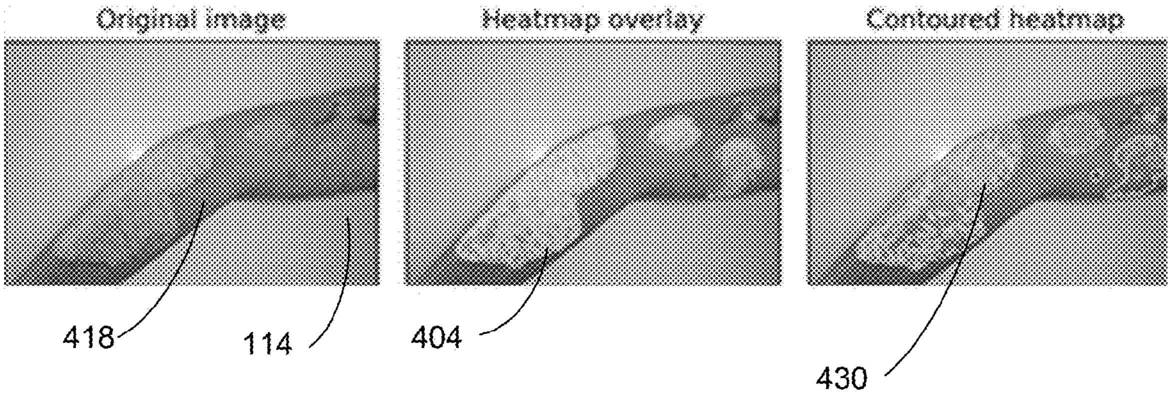
FIG. 10 is an example of images as input and outputs of the skin pathology mechanism utilizing disease severity heatmap for an application for psoriasis.

Referring now to FIG. 10, therein is shown an example of images as input and outputs of the skin pathology mechanism 402 of FIG. 4 utilizing the disease severity heatmap 404 for an application for psoriasis. FIG. 10 is one example for the embodiment relating to a Psoriasis Area and Severity Index (PASI) assessment. In this example, the PASI score is determined using three criteria: redness, thickness, and scaling, which collectively represent the severity of the condition.

In FIG. 10, the patient images 114 shown are the original image, the output for the disease severity heatmap 404 (the psoriasis severity heatmap) shown overlayed on the instance of the patient images 114 for the redness criterion, and the contoured heatmap or the disease severity contour 430 of FIG. 4 (psoriasis severity contour) pointing the most severe areas for the clinician.

For example, if the disease heatmap module 410 of FIG. 4 generates 4 contours levels, with the contour thresholds 432: 0.8, 0.6, 0.4, 0.2 (as in FIG. 10). The green line corresponds to the value 0.2 for one of the contour thresholds 432, the yellow line to 0.4 for another of the contour thresholds 432, the pink one to 0.6 for yet another of the contour thresholds 432, and the red one to 0.8 for a further of the contour thresholds 432. In this example shown in FIG. 10, redness severity on a skin lesion image featuring psoriasis. Red is more severe and yellow is less severe.

Further, the disease severity contour 430 can include multiple outlines of different colors as well outlines within outlines to highlight different severity levels within numerous affected regions within the skin region 418. Within each of the outline, the skin lesion is visible within outline.

Figure 11:
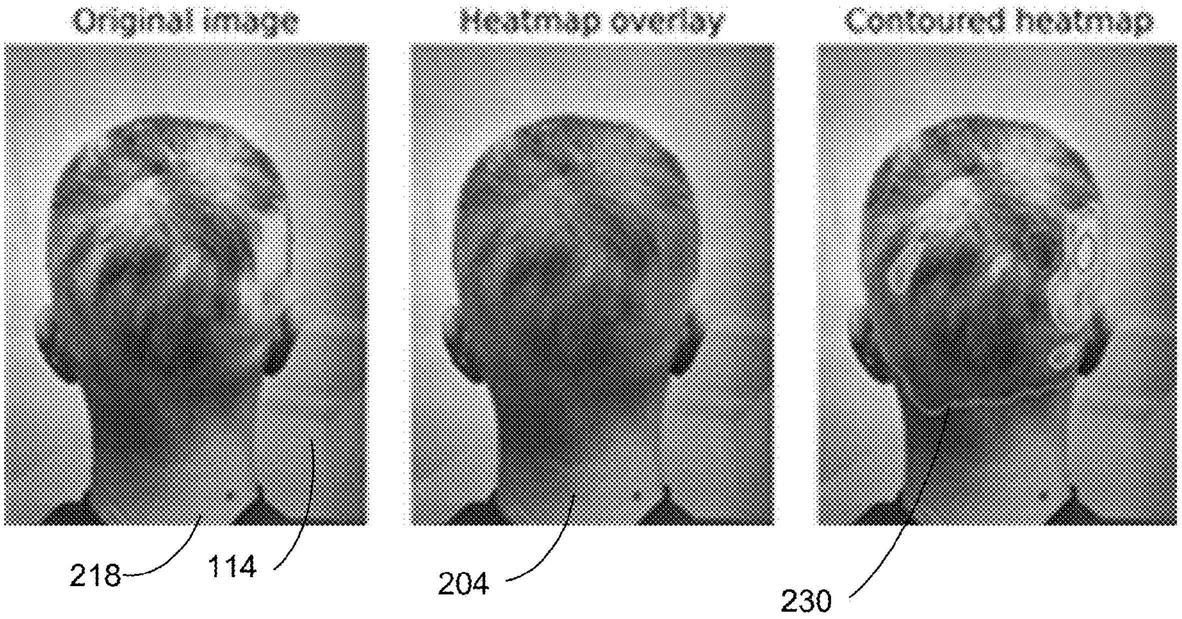
FIG. 11 is an example of images as input and outputs of the skin pathology mechanism utilizing disease severity heatmap for an application for alopecia.

Referring now to FIG. 11, therein is shown an example of images as input and outputs of the skin pathology mechanism utilizing the disease severity heatmap 204 for an application for alopecia. Similarly to FIG. 10, FIG. 11 is an example for the embodiment relating to a Severity of Alopecia Tool (SALT) assessment. In this example, the SALT assessment addresses the estimation of hair loss in clinical images of patients with alopecia, aiming to calculate the SALT score for the disease score 228 of FIG. 2 as an example. The SALT score is standard metric frequently used by dermatologists to assess the severity of the condition. Using four standardized views (front, left, right, and back), the SALT score is determined based on the percentage of hair loss and the extent of the affected area.

The skin pathology mechanism 202 of FIG. 2, as an example, can be a deep learning model, also as an example, capable of identifying the affected regions and estimating local severity through heatmaps from the disease severity heatmap 204, providing a detailed and objective assessment. FIG. 11 illustrates two different options on how to provide the heatmap output with the disease severity heatmap 204 with an alternative approach to visualizing the severity heatmap is by adjusting the opacity of the red color to represent severity levels to the dermatologist or the clinician.

FIG. 11 also illustrates the disease severity contour 230 to the dermatologist or the clinician. Additionally, colors for the disease severity contour 230 indicate different severity levels, with red denoting the most severe regions and green representing less severe areas. As an example, the disease severity heatmap 204, the disease severity contour 230, or a combination thereof is from 0 to 1, 1 meaning high severity and 100% of hair loss. For the disease severity contour 230, inside green line area there is more than 20% of hair loss, inside yellow area there is more than 40% of hair loss, etc.

In FIG. 11, the patient images 114 shown are the original image, the output for the disease severity heatmap 204 shown overlayed on the instance of the patient images 114 for the redness criterion, and the contoured heatmap or the disease severity contour 230 pointing the most severe areas for the clinician.

For example, if the disease heatmap module 210 of FIG. 2 generates 4 contours levels, with the contour thresholds 232 of FIG. 2. The green line corresponds to the value 0.2 for one of the contour thresholds 232, the yellow line to 0.4 for another of the contour thresholds 232, the pink one to 0.6 for yet another of the contour thresholds 232, and the red one to 0.8 for a further of the contour thresholds 232.

Further, the disease severity contour 230 can include multiple outlines of different colors as well outlines within outlines to highlight different severity levels within numerous affected regions within the skin region 218. Within each of the outline, the skin lesion is visible within outline.

Figure 12:
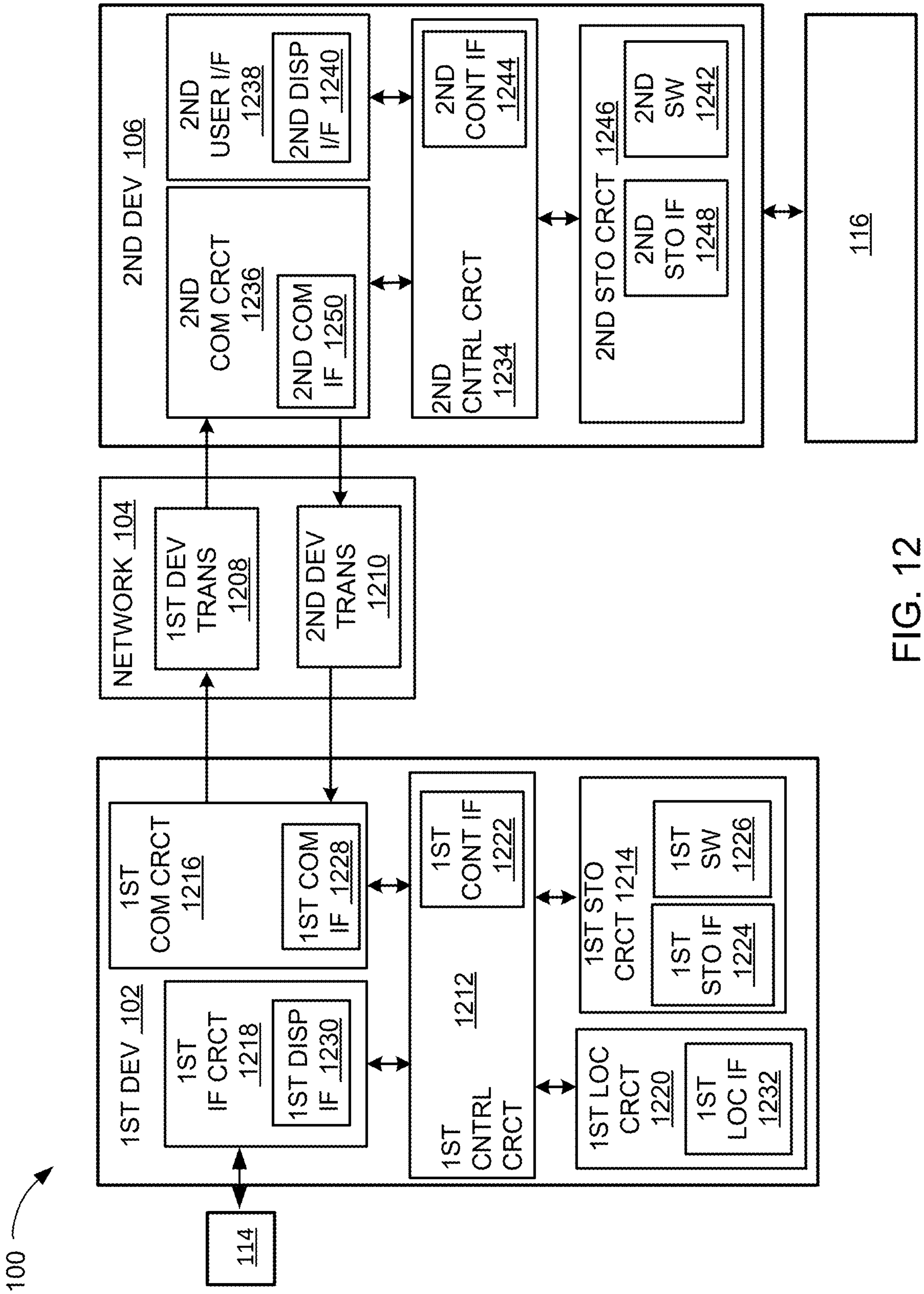
FIG. 12 is an exemplary block diagram of the compute system in an embodiment.

Referring now to FIG. 12, therein is shown an exemplary block diagram of the compute system 100 in an embodiment. The compute system 100 can include the first device 102, the network 104, and the second device 106. The first device 102 can send information in a first device transmission 1208 over the network 104 to the second device 106. The second device 106 can send information in a second device transmission 1210 over the network 104 to the first device 102.

For illustrative purposes, the compute system 100 is shown with the first device 102 as a client device, although it is understood that the compute system 100 can include the first device 102 as a different type of device.

Also, for illustrative purposes, the compute system 100 is shown with the second device 106 as a server, although it is understood that the compute system 100 can include the second device 106 as a different type of device. For example, the second device 106 can be a client device. By way of an example, the compute system 100 can be implemented entirely on the first device 102 with some functions of the skin pathology mechanism 116 executed by a first control circuit 1212.

Also, for illustrative purposes, the compute system 100 is shown with interaction between the first device 102 and the second device 106. However, it is understood that the first device 102 can be a part of or the entirety of a tablet computer, a smart phone, or a combination thereof. Similarly, the second device 106 can similarly interact with the first device 102 representing the tablet computer, the smart phone, or a combination thereof.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include the first control circuit 1212, a first storage circuit 1214, a first communication circuit 1216, a first interface circuit 1218, and a first location circuit 1220. The first control circuit 1212 can include a first control interface 1222. The first control circuit 1212 can execute a first software 1226 to provide the intelligence of the compute system 100.

The first control circuit 1212 can be implemented in a number of different manners. For example, the first control circuit 1212 can be a processor, an application specific integrated circuit (ASIC), an embedded processor, a microprocessor, a hardware control logic, a hardware finite state machine (FSM), a digital signal processor (DSP), or a combination thereof. The first control interface 1222 can be used for communication between the first control circuit 1212 and other functional units or circuits in the first device 102. The first control interface 1222 can also be used for communication that is external to the first device 102. The first control circuit 1212 can process the patient images 114 and execute portions of the skin pathology mechanism 116.

The first control interface 1222 can receive information from the other functional units/circuits or from external sources, or can transmit information to the other functional units/circuits or to external destinations. The external sources and the external destinations refer to sources and destinations external to the first device 102.

The first control interface 1222 can be implemented in different ways and can include different implementations depending on which functional units/circuits or external units/circuits are being interfaced with the first control interface 1222. For example, the first control interface 1222 can be implemented with a pressure sensor, an inertial sensor, a microelectromechanical system (MEMS), optical circuitry, waveguides, wireless circuitry, wireline circuitry, or a combination thereof.

The first storage circuit 1214 can store the first software 1226. The first storage circuit 1214 can also store the relevant information, such as data representing incoming patient images 114, the skin pathology mechanism 202 of FIG. 2 and the other embodiments, or a combination thereof.

The first storage circuit 1214 can be a volatile memory, a nonvolatile memory, an internal memory, an external memory, or a combination thereof. For example, the first storage circuit 1214 can be a nonvolatile storage such as non-volatile random-access memory (NVRAM), Flash memory, disk storage, or a volatile storage such as static random-access memory (SRAM).

The first storage circuit 1214 can include a first storage interface 1224. The first storage interface 1224 can be used for communication between the first storage circuit 1214 and other functional units or circuits in the first device 102. The first storage interface 1224 can also be used for communication that is external to the first device 102.

The first storage interface 1224 can receive information from the other functional units/circuits or from external sources, or can transmit information to the other functional units/circuits or to external destinations. The external sources and the external destinations refer to sources and destinations external to the first device 102. The first storage interface 1224 can receive input from and source data to the skin pathology mechanism 116.

The first storage interface 1224 can include different implementations depending on which functional units/circuits or external units/circuits are being interfaced with the first storage circuit 1214. The first storage interface 1224 can be implemented with technologies and techniques similar to the implementation of the first control interface 1222.

The first communication circuit 1216 can enable external communication to and from the first device 102. For example, the first communication circuit 1216 can permit the first device 102 to communicate with the second device 106 and the network 104. The first communication circuit 1216 can interact with the second device 106 for implementing the skin pathology mechanism 116.

The first communication circuit 1216 can also function as a communication hub allowing the first device 102 to function as part of the network 104 and not limited to be an endpoint or terminal circuit to the network 104. The first communication circuit 1216 can include active and passive components, such as microelectronics or an antenna, for interaction with the network 104.

The first communication circuit 1216 can include a first communication interface 1228. The first communication interface 1228 can be used for communication between the first communication circuit 1216 and other functional units or circuits in the first device 102. The first communication interface 1228 can receive information from the second device 106 for distribution to the other functional units/circuits or can transmit information to the other functional units or circuits.

The first communication interface 1228 can include different implementations depending on which functional units or circuits are being interfaced with the first communication circuit 128. The first communication interface 1228 can be implemented with technologies and techniques similar to the implementation of the first control interface 1222.

The first interface circuit 1218 allows the patient 112 of FIG. 1 to interface and interact with the first device 102. The first interface circuit 1218 can include an input device and an output device. Examples of the input device of the first interface circuit 1218 can include a keypad, a touchpad, soft-keys, a keyboard, a microphone, a camera, an infrared sensor for receiving remote signals, or any combination thereof to provide data and communication inputs, such as the patient images 114. The first interface circuit 1218 can receive the patient images 114 provided by the patient 112 that can be manipulated by the first control circuit 1212.

The first interface circuit 1218 can include a first display interface 1230. The first display interface 1230 can include an output device. The first display interface 1230 can include a projector, a video screen, a touch screen, a speaker, a microphone, a keyboard, and combinations thereof. The first display interface 1230 can allow the patient to view the results of the skin pathology mechanism 202 and the other embodiments on the output device.

The first control circuit 1212 can operate the first interface circuit 1218 to display information generated by the compute system 100 and receive input from the patient 112. The first control circuit 1212 can also execute the first software 1226 for the other functions of the compute system 100, including receiving location information from the first location circuit 1220. The first control circuit 1212 can further execute the first software 1226 for interaction with the network 104 via the first communication circuit 1216. The first control circuit 1212 can operate portions or all of the skin pathology mechanism 116.

The first control circuit 1212 can also receive location information from the first location circuit 1220. The first control circuit 1212 can operate the skin pathology mechanism 116 or portions thereof. The first control circuit 1212 can operate on the patient images 114, as well as any of the output for the skin pathology mechanism 202 and any of the embodiments for display to the patient 112.

The first location circuit 1220 can be implemented in many ways. For example, the first location circuit 1220 can function as at least a part of the global positioning system, an inertial compute system, a cellular-tower location system, a gyroscope, or any combination thereof. Also, for example, the first location circuit 1220 can utilize components such as an accelerometer, gyroscope, or global positioning system (GPS) receiver.

The first location circuit 1220 can include a first location interface 1232. The first location interface 1232 can be used for communication between the first location circuit 1220 and other functional units or circuits in the first device 102.

The first location interface 1232 can receive information from the other functional units/circuits or from external sources, or can transmit information to the other functional units/circuits or to external destinations. The external sources and the external destinations refer to sources and destinations external to the first device 102. The first location interface 1232 can receive the global positioning location from the global positioning system (not shown).

The first location interface 1232 can include different implementations depending on which functional units/circuits or external units/circuits are being interfaced with the first location circuit 1220. The first location interface 1232 can be implemented with technologies and techniques similar to the implementation of the first control circuit 1212.

The second device 106 can be optimized for implementing an embodiment of the present invention in a multiple device embodiment with the first device 102. The second device 106 can provide the additional or higher performance processing power compared to the first device 102. The second device 106 can include a second control circuit 1234, a second communication circuit 1236, a second user interface 1238, and a second storage circuit 1246.

The second user interface 1238 allows an operator (not shown) to interface and interact with the second device 106. The second user interface 1238 can include an input device and an output device. Examples of the input device of the second user interface 1238 can include a keypad, a touchpad, soft-keys, a keyboard, a microphone, or any combination thereof to provide data and communication inputs. Examples of the output device of the second user interface 1238 can include a second display interface 1240. The second display interface 1240 can include a display, a projector, a video screen, a speaker, or a combination thereof.

The second control circuit 1234 can execute a second software 1242 to provide the intelligence of the second device 106 of the compute system 100. The second software 1242 can operate in conjunction with the first software 1226. The second control circuit 1234 can provide additional performance compared to the first control circuit 1212. The second control circuit 1234 can execute instructions to implement all or some of the functions of the skin pathology mechanism 116 including the nail ailment AI 212 of FIG. 2.

The second control circuit 1234 can operate the second user interface 1238 to display information. The second control circuit 1234 can also execute the second software 1242 for the other functions of the compute system 100, including operating the second communication circuit 1236 to communicate with the first device 102 over the network 104.

The second control circuit 1234 can be implemented in a number of different manners. For example, the second control circuit 1234 can be a processor, an embedded processor, a microprocessor, hardware control logic, a hardware finite state machine (FSM), a digital signal processor (DSP), or a combination thereof.

The second control circuit 1234 can include a second control interface 1244. The second control interface 1244 can be used for communication between the second control circuit 1234 and other functional units or circuits in the second device 106. The second control interface 1244 can also be used for communication that is external to the second device 106.

The second control interface 1244 can receive information from the other functional units/circuits or from external sources, or can transmit information to the other functional units/circuits or to external destinations. The external sources and the external destinations refer to sources and destinations external to the second device 106.

The second control interface 1244 can be implemented in different ways and can include different implementations depending on which functional units/circuits or external units/circuits are being interfaced with the second control interface 1244. For example, the second control interface 1244 can be implemented with a pressure sensor, an inertial sensor, a microelectromechanical system (MEMS), optical circuitry, waveguides, wireless circuitry, wireline circuitry, or a combination thereof.

The second storage circuit 1246 can store the second software 1242. The second storage circuit 1246 can also store the information such as data representing incoming patient images 114, data representing the individual nail images 218 of FIG. 2, sound files, or a combination thereof.

The second storage circuit 1246 can be sized to provide the additional storage capacity to supplement the first storage circuit 1214.

For illustrative purposes, the second storage circuit 1246 is shown as a single element, although it is understood that the second storage circuit 1246 can be a distribution of storage elements. Also, for illustrative purposes, the compute system 100 is shown with the second storage circuit 1246 as a single hierarchy storage system, although it is understood that the compute system 100 can include the second storage circuit 1246 in a different configuration. For example, the second storage circuit 1246 can be formed with different storage technologies forming a memory hierarchal system including different levels of caching, main memory, rotating media, or off-line storage.

The second storage circuit 1246 can be a controller of a volatile memory, a nonvolatile memory, an internal memory, an external memory, or a combination thereof. For example, the second storage circuit 1246 can be a controller of a nonvolatile storage such as non-volatile random-access memory (NVRAM), Flash memory, disk storage, or a volatile storage such as static random access memory (SRAM).

The second storage interface 1248 can receive information from the other functional units/circuits or from external sources, or can transmit information to the other functional units/circuits or to external destinations. The external sources and the external destinations refer to sources and destinations external to the second device 106.

The second storage interface 1248 can include different implementations depending on which functional units/circuits or external units/circuits are being interfaced with the second storage circuit 1246. The second storage interface 1248 can be implemented with technologies and techniques similar to the implementation of the second control interface 1244.

The second communication circuit 1236 can enable external communication to and from the second device 106. For example, the second communication circuit 1236 can permit the second device 106 to communicate with the first device 102 over the network 104.

The second communication circuit 1236 can also function as a communication hub allowing the second device 106 to function as part of the network 104 and not limited to be an endpoint or terminal unit or circuit to the network 104. The second communication circuit 1236 can include active and passive components, such as microelectronics or an antenna, for interaction with the network 104.

The second communication circuit 1236 can include a second communication interface 1250. The second communication interface 1250 can be used for communication between the second communication circuit 1236 and other functional units or circuits in the second device 106. The second communication interface 1250 can receive information from the other functional units/circuits or can transmit information to the other functional units or circuits.

The second communication interface 1250 can include different implementations depending on which functional units or circuits are being interfaced with the second communication circuit 1236. The second communication interface 1250 can be implemented with technologies and techniques similar to the implementation of the second control interface 1244.

The second communication circuit 1236 can couple with the network 104 to send information to the first device 102. The first device 102 can receive information in the first communication circuit 1216 from the second device transmission 1210 of the network 104. The compute system 100 can be executed by the first control circuit 1212, the second control circuit 1234, or a combination thereof. For illustrative purposes, the second device 106 is shown with the partition containing the second user interface 1238, the second storage circuit 1246, the second control circuit 1234, and the second communication circuit 1236, although it is understood that the second device 106 can include a different partition. For example, the second software 1242 can be partitioned differently such that some or all of its function can be in the second control circuit 1234 and the second communication circuit 1236. Also, the second device 106 can include other functional units or circuits not shown in FIG. 12 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using a gate array, an application specific integrated circuit (ASIC), circuitry, a processor, a computer, integrated circuit, integrated circuit cores, a pressure sensor, an inertial sensor, a microelectromechanical system (MEMS), a passive device, a physical non-transitory memory medium containing instructions for performing the software function of the skin pathology mechanism 116, a portion therein, or a combination thereof.

For illustrative purposes, the compute system 100 is described by operation of the first device 102 and the second device 106. It is understood that the first device 102 and the second device 106 can operate any of the modules and functions of the compute system 100 including a distribution of the functions of the skin pathology mechanism 116.

Figure 13:
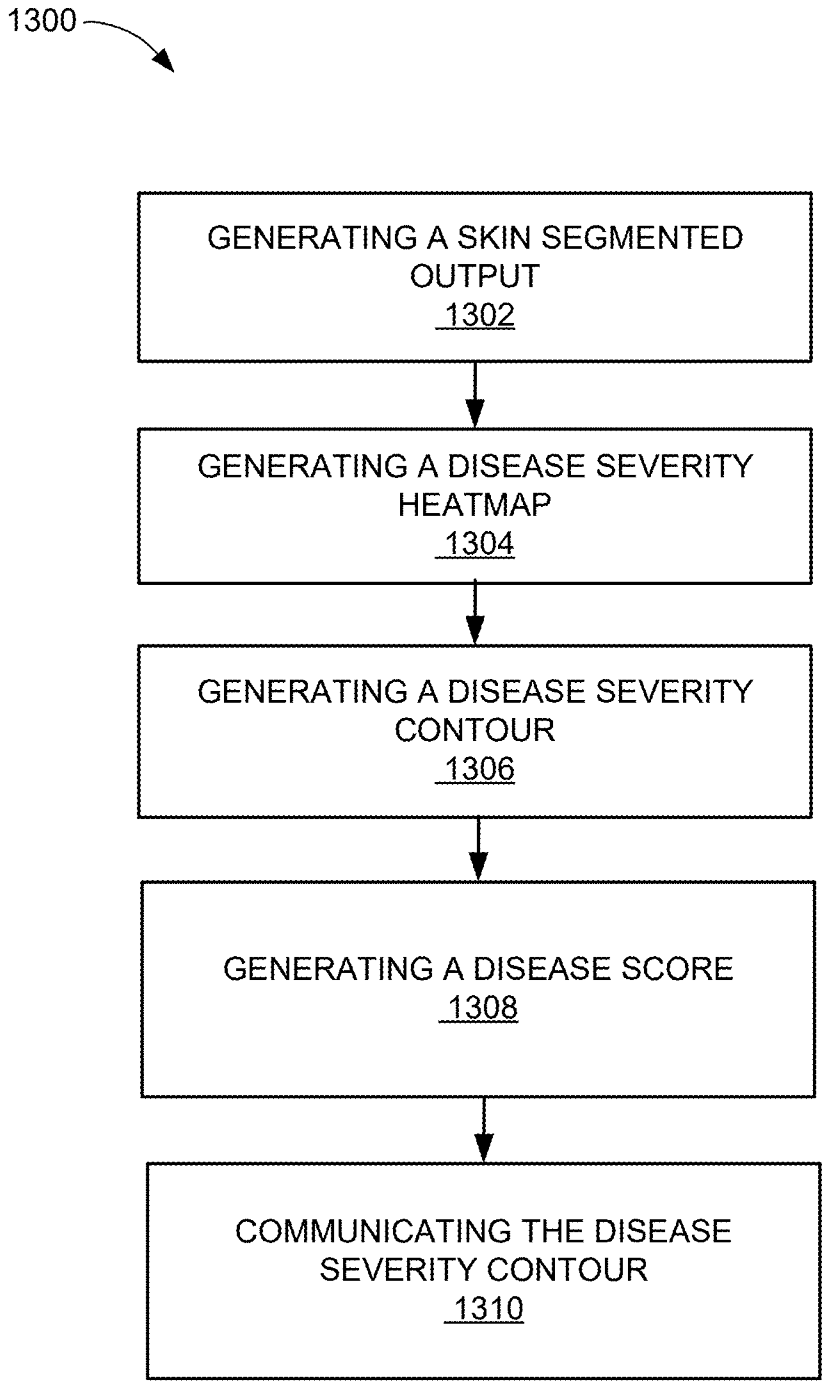
FIG. 13 is a flow chart of a method of operation of a compute system in an embodiment of the present invention.

Referring now to FIG. 13, therein is shown a flow chart of a method 1300 of operation of a compute system 100 of FIG. 1 in an embodiment of the present invention. The method 1300 includes: generating a skin segmented output including a skin region based on a patient image in a block 1302; generating a disease severity heatmap based on the skin segmented output and the patient image in a block 1304; generating a disease severity contour based on the disease severity heatmap and for the skin region in a block 1306; generating a disease score from the disease severity heatmap in a block 1308; and communicating the disease severity contour, the disease score, or a combination thereof for displaying on a device in a block 1310.

One or more embodiments provide heatmap-based approach by prioritizing transparency and usability for healthcare professionals. An embodiment not only generates intuitive heatmaps but also addresses the challenge to ensure enhancements of clinical decision-making, while not hindering visualizations of a given pathology. By translating heatmaps into contour-based representations, the outputs of an embodiment maintains the visual clarity of the original skin lesion image and provides clear delineations of severity levels.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a compute system comprising:

segmenting a patient image to generate a skin segmented output isolating a skin region and a non-skin region using EfficientNet;

generating a plurality of disease severity heatmaps with a trained neural network based on the skin segmented output and the patient image, wherein the plurality of disease severity heatmaps are generated by the trained neural network assigning a severity value to each pixel of the skin region and comparing each of the severity values with one or more disease thresholds;

generating a disease severity contour based on the respective disease severity heatmap and for the skin region, the disease severity contour is generated by converting the respective disease severity heatmap to a contour-based representation, based on one or more contour thresholds, that delineates a severity level;

generating a disease score from the plurality of disease severity heatmaps; and communicating the disease severity contour and the disease score for displaying on a device.

2. The method as claimed in claim 1, further comprising:

generating a disease segmented output based on the plurality of disease severity heatmaps; and communicating the disease segmented output for displaying on the device.

3. The method as claimed in claim 1, further comprising:

generating a raw disease segmented output based on the patient image;

generating a raw heatmap based on the raw disease segmented output; and wherein generating the plurality of disease severity heatmaps based on the skin segmented output and the patient image includes:

generating the plurality of disease severity heatmaps based on the raw heatmap and for the skin region.

4. The method as claimed in claim 1, further comprising:

generating a raw disease segmented output, a raw heatmap, or a combination thereof based on the patient image; and wherein generating the plurality of disease severity heatmaps based on the skin segmented output and the patient image includes:

generating the plurality of disease severity heatmaps for the skin region based on the raw disease segmented output, the raw heatmap, or a combination thereof.

5. The method as claimed in claim 1, further comprising:

generating a raw heatmap based on the patient image; and wherein generating the disease score from the plurality of disease severity heatmaps or generating the disease severity contour based on the respective disease severity heatmap includes:

generating the disease score, the disease severity contour, or a combination thereof based on the raw heatmap.

6. The method as claimed in claim 1, further comprising:

generating a raw disease segmented output based on the patient image; and wherein generating the disease score from the plurality of disease severity heatmaps or generating the disease severity contour based on the respective disease severity heatmap includes:

generating the disease score, the disease severity contour, or a combination thereof based on the raw disease segmented output.

7. The method as claimed in claim 1, wherein generating the disease score and generating the disease severity contour includes generating concurrently the disease score and the disease severity contour from the plurality of disease severity heatmaps for the skin region.

8. A compute system comprising:

a control circuit, including a processor, configured to:

segment a patient image to generate a skin segmented output isolating a skin region and a non-skin region using EfficientNet;

generate a plurality of disease severity heatmaps with a trained neural network based on the skin segmented output and the patient image, wherein the plurality of disease severity heatmaps are generated by the trained neural network assigning a severity value to each pixel of the skin region and comparing each of the severity values with one or more disease thresholds;

generate a disease severity contour based on the respective disease severity heatmap and for the skin region, the disease severity contour is generated by converting the respective disease severity heatmap to a contour-based representation, based on one or more contour thresholds, that delineates a severity level;

generate a disease score from the plurality of disease severity heatmaps; and communicate the disease severity contour and the disease score for displaying on a device.

9. The system as claimed in claim 8, wherein the control circuit is configured to:

generate a disease segmented output based on the plurality of disease severity heatmaps; and communicate the disease segmented output for displaying on the device.

10. The system as claimed in claim 8, wherein the control circuit is configured to:

generate a raw disease segmented output based on the patient image;

generate a raw heatmap based on the raw disease segmented output; and generate the plurality of disease severity heatmaps based on the raw heatmap and for the skin region.

11. The system as claimed in claim 8, wherein the control circuit is configured to:

generate a raw disease segmented output, a raw heatmap, or a combination thereof based on the patient image; and generate the plurality of disease severity heatmaps for the skin region based on the raw disease segmented output, the raw heatmap, or a combination thereof.

12. The system as claimed in claim 8, wherein the control circuit is configured to:

generate a raw heatmap based on the patient image; and generate the disease score, the disease severity contour, or a combination thereof based on the raw heatmap.

13. The system as claimed in claim 8, wherein the control circuit is configured to:

generate a raw disease segmented output based on the patient image; and generate the disease score, the disease severity contour, or a combination thereof based on the raw disease segmented output.

14. The system as claimed in claim 8, wherein the control circuit is configured to generate concurrently the disease score and the disease severity contour from the plurality of disease severity heatmaps for the skin region.

15. A non-transitory computer readable medium including instructions executable by a control circuit for a compute system performing functions comprising:

segmenting a patient image to generate a skin segmented output isolating a skin region and a non-skin region using EfficientNet;

generating a plurality of disease severity heatmaps with a trained neural network based on the skin segmented output and the patient image, wherein the plurality of disease severity heatmaps are generated by the trained neural network assigning a severity value to each pixel of the skin region and comparing each of the severity values with one or more disease thresholds;

generating a disease severity contour based on the respective disease severity heatmap and for the skin region, the disease severity contour is generated by converting the respective disease severity heatmap to a contour-based representation, based on one or more contour thresholds, that delineates a severity level;

generating a disease score from the plurality of disease severity heatmaps; and communicating the disease severity contour and the disease score for displaying on a device.

16. The non-transitory computer readable medium as claimed in claim 15, further comprising:

generating a disease segmented output based on the plurality of disease severity heatmaps; and communicating the disease segmented output for displaying on the device.

17. The non-transitory computer readable medium as claimed in claim 15, further comprising:

generating a raw disease segmented output based on the patient image;

generating a raw heatmap based on the raw disease segmented output; and wherein generating the plurality of disease severity heatmaps based on the skin segmented output and the patient image includes:

generating the plurality of disease severity heatmaps based on the raw heatmap and for the skin region.

18. The non-transitory computer readable medium as claimed in claim 15, further comprising:

generating a raw disease segmented output, a raw heatmap, or a combination thereof based on the patient image; and wherein generating the plurality of disease severity heatmaps based on the skin segmented output and the patient image includes:

generating the plurality of disease severity heatmaps for the skin region based on the raw disease segmented output, the raw heatmap, or a combination thereof.

19. The non-transitory computer readable medium as claimed in claim 15, further comprising:

generating a raw heatmap based on the patient image; and wherein generating the plurality of disease severity heatmaps based on the skin segmented output and the patient image includes:

generating the disease score, the disease severity contour, or a combination thereof based on the raw heatmap.

20. The non-transitory computer readable medium as claimed in claim 15, further comprising:

generating a raw disease segmented output based on the patient image; and wherein generating the disease score from the plurality of disease severity heatmaps or generating the disease severity contour based on the respective disease severity heatmap includes:

generating the disease score, the disease severity contour, or a combination thereof based on the raw disease segmented output.

* * * * *